(12) United States Patent
Lu et al.

(10) Patent No.: US 8,966,402 B2
(45) Date of Patent: Feb. 24, 2015

(54) SYSTEM AND METHOD FOR EDITING INTERACTIVE THREE-DIMENSION MULTIMEDIA, AND ONLINE EDITING AND EXCHANGING ARCHITECTURE AND METHOD THEREOF

(75) Inventors: Yu-Ling Lu, Taipei (TW); Chi-Jui Lien, Taipei (TW); Chien-Ju Li, Taipei (TW); Wei-Ming Chen, Taipei (TW)

(73) Assignee: National Taipei University of Education, Taipei (TW)

( * ) Notice: Subject to any disclaimer, the term of this patent is extended or adjusted under 35 U.S.C. 154(b) by 797 days.

(21) Appl. No.: 13/221,090

(22) Filed: Aug. 30, 2011

(65) Prior Publication Data

US 2013/0007669 A1    Jan. 3, 2013

(30) Foreign Application Priority Data

Jun. 29, 2011 (TW) ............................ 100122924 A
Jul. 6, 2011 (TW) ............................ 100123957 A

(51) Int. Cl.
*G06F 3/0481* (2013.01)
*G09B 5/06* (2006.01)
*G11B 27/034* (2006.01)
*G06T 19/00* (2011.01)

(52) U.S. Cl.
CPC .............. *G09B 5/065* (2013.01); *G11B 27/034* (2013.01); *G06T 19/00* (2013.01); *A63F 2300/632* (2013.01); *G06T 2200/24* (2013.01)
USPC ........... 715/848; 715/738; 715/771; 715/764

(58) Field of Classification Search
CPC ................................. G06F 3/04815

USPC ........................................................ 715/848
See application file for complete search history.

(56) References Cited

U.S. PATENT DOCUMENTS

| 5,697,788 A * | 12/1997 | Ohta ............................ 434/118 |
| 7,006,881 B1 * | 2/2006 | Hoffberg et al. ............... 700/83 |
| 8,463,845 B2 * | 6/2013 | Bury et al. .................... 709/203 |
| 8,516,266 B2 * | 8/2013 | Hoffberg et al. ............. 713/189 |
| 8,806,346 B2 * | 8/2014 | Hedges ........................ 715/738 |
| 2002/0010655 A1 * | 1/2002 | Kjallstrom ..................... 705/27 |

(Continued)

OTHER PUBLICATIONS

Chandan et al., "CHIMP: A Framework for Supporting Distributed Multimedia Document Authoring and Presentation", in Proceedings of the fourth ACM international conference on Multimedia, Boston, Massachusetts, USA, Nov. 1996, pp. 329-340.*

*Primary Examiner* — Reza Nabi
(74) *Attorney, Agent, or Firm* — Ditthavong & Steiner, P.C.

(57) ABSTRACT

A system and method are provided to edit interactive three-dimensional multimedia. A user interface of the system is provided with an event level template that includes event series levels with multiple event developing points. Through the user interface, multiple interactive events related to a first character of the event developing point are edited. Through a three-dimensional engine, interactive relevances are built up between interactive events and multiple materials inside one or more database. When the interactive three-dimensional multimedia with multiple materials is output, the interactive events corresponding to the event developing points are performed according to a user command. An online editing and exchanging method integrated with the system and method is also provided to share pre-edited templates on an exchange server; each of the pre-edited templates is extracted from an interactive three-dimensional multimedia pre-edited by the system and method.

13 Claims, 19 Drawing Sheets

(56) References Cited

U.S. PATENT DOCUMENTS

| | | | |
|---|---|---|---|
| 2002/0116716 A1* | 8/2002 | Sideman | 725/91 |
| 2004/0150663 A1* | 8/2004 | Kim | 345/723 |
| 2006/0259588 A1* | 11/2006 | Lerman et al. | 709/219 |
| 2007/0198923 A1* | 8/2007 | Kodosky et al. | 715/523 |
| 2008/0013916 A1* | 1/2008 | Sharpe et al. | 386/52 |
| 2008/0014986 A1* | 1/2008 | Yun | 455/556.1 |
| 2008/0172704 A1* | 7/2008 | Montazemi | 725/105 |
| 2010/0030578 A1* | 2/2010 | Siddique et al. | 705/3 |
| 2010/0035682 A1* | 2/2010 | Gentile et al. | 463/30 |
| 2011/0246554 A1* | 10/2011 | Bury et al. | 709/203 |
| 2011/0246892 A1* | 10/2011 | Hedges | 715/723 |
| 2011/0246900 A1* | 10/2011 | Hedges | 715/738 |
| 2012/0236201 A1* | 9/2012 | Larsen et al. | 348/468 |
| 2012/0304096 A1* | 11/2012 | Shikhman | 715/771 |
| 2013/0066750 A1* | 3/2013 | Siddique et al. | 705/27.2 |
| 2013/0147913 A1* | 6/2013 | Steiner et al. | 348/43 |
| 2013/0198714 A1* | 8/2013 | Moody et al. | 717/113 |
| 2013/0236160 A1* | 9/2013 | Gentile et al. | 386/248 |
| 2014/0052696 A1* | 2/2014 | Soroushian | 707/691 |

* cited by examiner

SYSTEM AND METHOD FOR EDITING INTERACTIVE THREE-DIMENSION MULTIMEDIA, AND ONLINE EDITING AND EXCHANGING ARCHITECTURE AND METHOD THEREOF

CROSS-REFERENCES TO RELATED APPLICATIONS

This non-provisional application claims priority under 35 U.S.C. §119(a) on Patent Application No. 100122924 and 100123957 filed in Taiwan, R.O.C. on Jun. 29, 2011 and Jul. 6, 2011, the entire contents of which are hereby incorporated by reference.

BACKGROUND

1. Field of Invention

The disclosure relates to technologies of editing and exchanging multimedia, and in particular to a system and method for editing interactive three-dimension multimedia, and online editing and exchanging architecture and method thereof.

2. Related Art

Nowadays, designs for an educational gaming system are aimed mainly towards monotonous combinations of question-answer quizzes and gaming elements. Without a powerful game editing platform, the designer can only create and edit quizzes through single directions, or simply combine several related quizzes and implement into the game rules of an available game editing platform. During operations of such educational gaming platform, the students must answer the preset questions in different game sections of the educational gaming system to continue the educational game.

In the educational gaming system, the answers of the students can be evaluated and analyzed, in order to estimate the learning results. However, the monotonousness of the teacher's quizzes and lacking of cause-and-result relevances between combined relative quizzes, does not help the students cultivate their high-level thinking abilities during the operating processes. Another problem is that the editing module of the educational gaming system is only attached to simple gaming platforms. Namely, the editing module can only make very limited changes to the gaming contents; in addition, all the quiz designs are limited by the function or capability of the editing module. Consequently, the teaching effect of such educational gaming system is close to an index-type learning guidance system that provides knowledge and information via several linear directions.

Comparatively, the game editor module for popular computer games has better functionality, yet such game editor modules mostly have only limited gaming environment editing functions (such as maps). Changes to character/role settings or certain game rules are not allowed, so the players cannot change events in the game or develop new game stories other than those of the predetermined story lines.

In addition, accompanying the progress and popularization of modern technology, today interactive 3D-multimedia technology is able to provide a combination of three-dimensional images and sounds. However, currently the operation and use of such editing module for interactive 3D multimedia still requires high-level skills, such as advanced programming capabilities, which most people do not have.

Furthermore, as to the development of writing assistance technology, the most popular function is to provide choices or hints of available vocabulary and phrases during the user's writing process; such technology is usually integrated with bilingual input software, translation software, or a language learning system. Current writing assistance technology is not able to provide a reference capability for scenario frameworks and story lines when writing and developing a novel or thesis. For completed sections, the writing assistance technology is not able to provide a preview function that actually presents/plays a multimedia with a live character/role and scenarios.

No matter what the applied field is, since a general multimedia file might include alphanumeric data, image/video data, and sound/audio data with various formats and types, all of it must be transferred into an integrated single multimedia file before being shared on the internet. However, such a multimedia file can only be directly accessed and played, and is no longer editable.

SUMMARY

Accordingly, in an embodiment of the disclosure, a system for editing an interactive 3D multimedia is provided. The interactive 3D (three dimensional) multimedia has interactive events. The system includes a user interface, an event editing module, a 3D (three dimensional) graphic engine and multiple databases, and an event executing module. The user interface is operable for a user to edit the interactive 3D multimedia. The event editing module provides an event level template with an event series level; the event series level has multiple event developing points for editing the interactive events corresponding to the event developing points respectively; each of the corresponding event developing points and the interactive events are related to a first character. Through the 3D graphic engine, relevances between the interactive event and multiple selected materials stored in the databases are established. The event executing module outputs the interactive 3D multimedia with the selected materials; and according to a user command the interactive event corresponding to each of the event developing points is executed.

In another embodiment, a method for editing interactive 3D multimedia includes the following sections. The interactive 3D multimedia has interactive events. Provide a user interface with an event level template displayed thereon; the event level template has an event series level, and the event series level includes event developing points corresponding to the interactive events. Edit a selected one of the event developing points through the user interface; the selected one of the event developing points being adapted to edit a corresponding one the interactive events regarding a first character. Through a 3D graphic engine, establish relevances between the interactive events and selected materials stored in databases. Output the interactive 3D multimedia with the selected materials. According to a user command, execute the interactive events corresponding to the event developing points.

In another embodiment, a computer-readable storage medium stores multiple computer-executable commands. A method for editing interactive 3D multimedia is executed when these computer-executable commands are executed. The method for editing interactive 3D multimedia includes the following sections. The interactive 3D multimedia has interactive events. Provide a user interface with an event level template displayed thereon, the event level template has an event series level; and the event series level includes event developing points corresponding to the interactive events. Edit a selected one of the event developing points through the user interface; the selected one of the event developing points being adapted to edit a corresponding one the interactive events regarding a first character. Through a 3D graphic engine, establish relevances between the interactive events and selected materials stored in databases. Output the interactive 3D multimedia with the selected materials. According to a user command, execute the interactive events corresponding to the event developing points. Such a computer-readable storage medium is realized by compact discs, memory cards, portable flash memory and databases downloadable through private/public network.

In another embodiment, an architecture for editing and exchanging an interactive 3D multimedia mainly includes an exchange server, a second user terminal and a user interface installed in the exchange server or the second user terminal. The user interface edits the uploaded interactive 3D multimedia according to a second user terminal. The exchange server further includes an internet-operable lobby interface, and a template database. The template database stores one or more uploaded interactive 3D multimedia template of the interactive 3D multimedia. The interactive 3D multimedia is pre-edited according to a first user command. The interactive 3D multimedia template includes a pre-edited event level template; the pre-edited event level template has an event series level; the event series level has event developing points. The second user terminal further includes a web browser, an event editing module, a 3D graphic engine, one or more databases and an event executing module. The web browser selects the uploaded interactive 3D multimedia template according to the second user command. The event editing module parses the interactive 3D multimedia template into a new interactive 3D multimedia according to the second user command. Through the user interface mentioned previously, the interactive events corresponding to the event developing points of the new interactive 3D multimedia are edited. The 3D graphic engine establishes relevances between the interactive events and multiple materials stored in the databases. The event executing module outputs the new interactive 3D multimedia with multiple materials and executes the activated interactive events.

In another embodiment, a method for editing and exchanging interactive 3D multimedia includes the following sections. Operate a lobby interface on an exchange server through the internet. Select an interactive 3D multimedia template of the interactive 3D multimedia according to a second user command from a second user terminal. The interactive 3D multimedia is pre-edited by a first user command from a first user terminal. The interactive 3D multimedia template includes a pre-edited event level template; the pre-edited event level template has an event series level; the event series level has event developing points. Parse the interactive 3D multimedia template into a new interactive 3D multimedia, such that interactive events corresponding to the event developing points are edited through a user interface according to the second user command. Output the new interactive 3D multimedia and execute an activated one of the interactive events.

In another embodiment, a computer-readable storage medium stores multiple computer-executable commands thereon. A method for editing and exchanging interactive 3D multimedia is executed when these computer-executable commands are executed. The method for editing and exchanging interactive 3D multimedia includes the following sections. Operate a lobby interface on an exchange server through the internet. Select an interactive 3D multimedia template of the interactive 3D multimedia according to a second user command from a second user terminal. The interactive 3D multimedia is pre-edited by a first user command from a first user terminal. The interactive 3D multimedia template includes a pre-edited event level template; the pre-edited event level template has an event series level; the event series level has event developing points. Parse the interactive 3D multimedia template into a new interactive 3D multimedia, such that interactive events corresponding to the event developing points are edited through a user interface according to the second user command. Output the new interactive 3D multimedia and execute an activated one of the interactive events. Such computer-readable storage medium is realized by compact discs, memory cards, portable flash memory and databases downloadable through private/public network.

BRIEF DESCRIPTION OF THE DRAWINGS

The disclosure will become more fully understood from the detailed description given herein below for illustration only, and thus not limitative of the disclosure, wherein.

DETAILED DESCRIPTION

In the following embodiments, an editing system and method is disclosed mainly for editing a set of "interactive 3D multimedia" (Interactive Three-dimensional Multimedia) on a computer or computing device (User Terminal). An online exchanging architecture and method integrated with the editing system and method are also provided as a mechanism of online-exchanging or even online-editing an "interactive 3D-multimedia template" extracted from the interactive 3D multimedia. Users from different user terminals are able to jointly edit the same interactive 3D multimedia by sharing and installing the shared interactive 3D-multimedia template of the interactive 3D multimedia. The "interactive 3D multimedia" is realized by multiple sets of computer-executable specific event procedures and multiple sets of computer-playable vide and/or audio data" corresponding to the event procedures. According to a user input command, the sets of computer-executable specific event procedures are executed by a computer or a computing device and the corresponsive video and/or audio data corresponding to the event procedures are played back accordingly. Interactive 3D multimedia in the following embodiments include image materials, audio materials, film materials, scenario section materials, 3D map materials, 3D scene materials and 3D character materials, and also one or more "event level templates" and the interactive relevances between interactive events defines by the event level templates and various corresponding materials mentioned previously. When an interactive 3D multimedia is output or executed, these corresponding video/audio materials are output (or played back), through a display/monitor or speakers according to a user's command and system settings. Operations related to a preset interactive event are also performed when the interactive event is triggered. Furthermore, whenever necessary, multiple types of materials are played or output by overlaying with each other. Interactive event is a combination of timings, relations, dialogs and character activities between and for materials (characters, scenario sections, scene objects, maps etc.). One of the examples for the set of "interactive 3D multimedia" is an RPG (Role Playing Game).

Figure 1A:
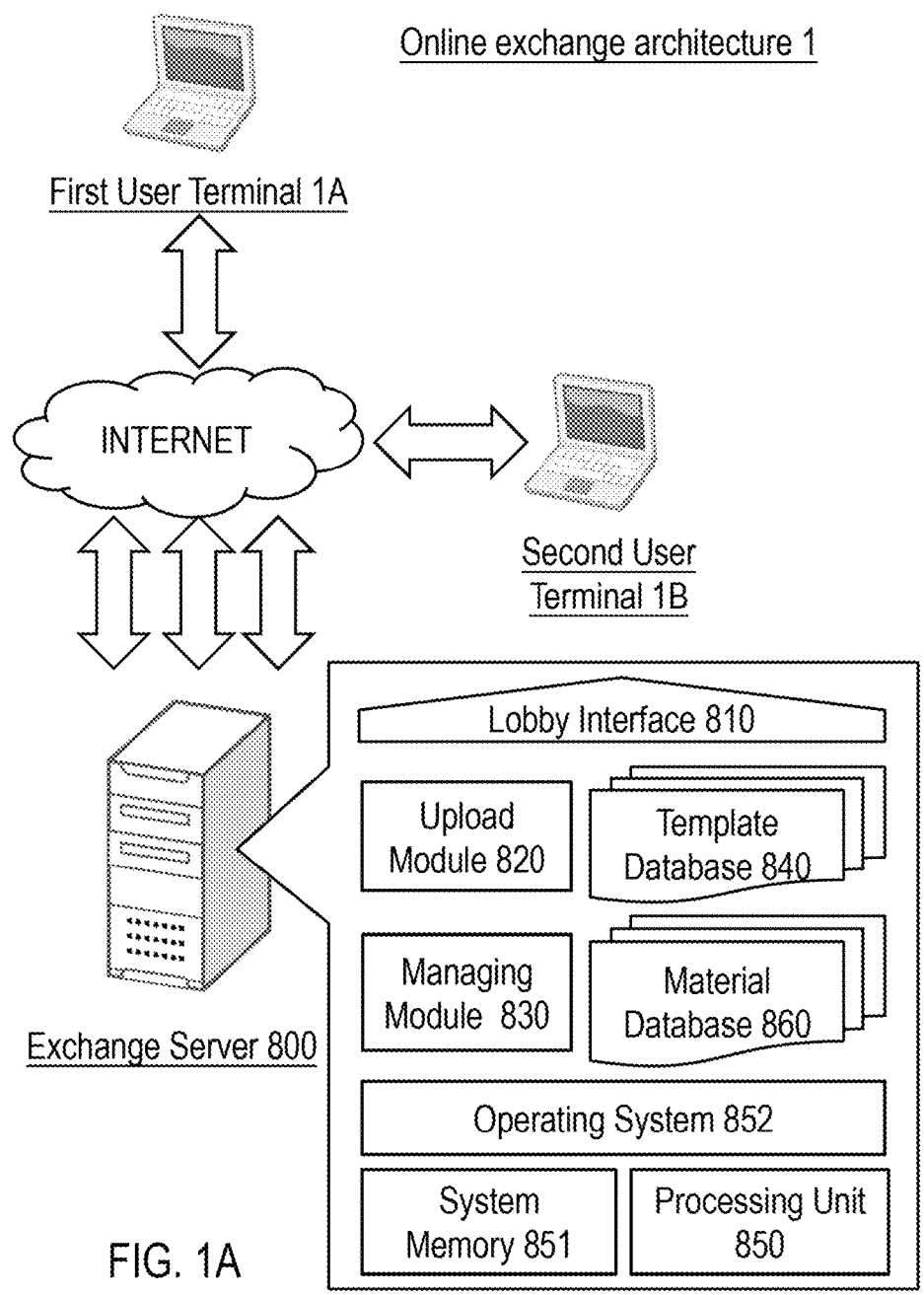
FIG. 1A is a systematic block diagram of an online exchanging architecture for interactive 3D multimedia according to an embodiment.

Please refer to FIG. 1A, which is a systematic block diagram of an online exchanging architecture for interactive 3D multimedia according to an embodiment. Online exchanging architecture 1 mainly includes a first and second user terminal 1A/1B, and an exchange server 800 in signal connection with the first/second user terminal 1A/1B through the internet. "In signal connection" means two or more components are connected through wired or wireless communication links, including direct circuit connection or network connection.

Exchange server 800 is a computer system, which mainly includes processing unit 850 (as computing basis), system memory 851, operating system 852, and modules/databases mainly related to online exchange (or online editing) operation of interactive 3D multimedia: lobby interface 810, upload module 820, managing module 830 and template database 840 and material database 860. Lobby interface 810 is a web-based interface, including multiple internet-accessible webpages each integrated with multiple hyperlinks; and every hyperlink initiates at least a set of preset procedures performed by the processing unit 850. Upload module 820 is realized by processing unit 850 performing a set of preset procedures (under operating system 852 or firmware level environment), to build a transmission connection between the exchange server 800 and first/second user terminals 1A/1B and transmit certain electrical files. Managing module 830 is realized by processing unit 850 performing another set of preset managing procedures (under operating system 852 or firmware level environment), to perform certain tasks regarding the management of exchange server 800. Template database 840 and material database 860 can be realized by storage media such as hard disc or flash memory, or any type of file systems.

Figure 1B:
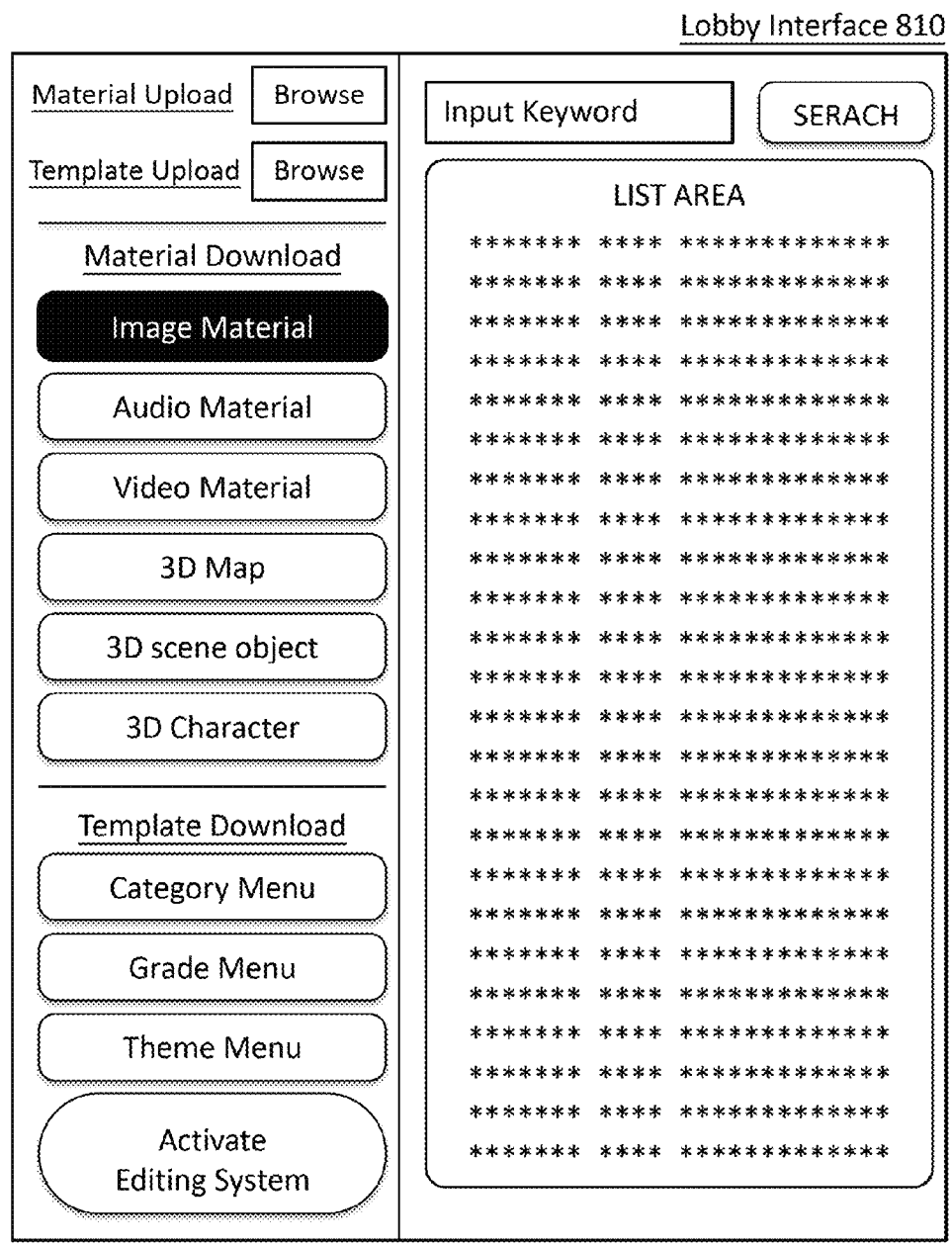
FIG. 1B is an explanatory diagram of a webpage of a lobby interface according to another embodiment.

Please refer to FIG. 1B, which is an explanatory diagram of a webpage of a lobby interface according to another embodiment. Lobby interface 810 is an internet-operable window operation interface (when displayed on a computer screen of the user terminal or other computer). Multiple operable webpages of lobby interface 810 are provided for users to operate lobby interface 810 through first/second user terminal 1A/1B, so as to exchange or edit sets of interactive 3D multimedia. In the operable webpage of lobby interface 810 in FIG. 1B, the left part provides functional buttons from top to bottom: "Browse (Material Upload)", "Browse (Template Upload)", "Material Download", "Template Download", "Activate Editing System FOR Interactive 3D Multimedia"; the right part provides input columns or functional buttons "Input Keyword" Column, "Search" button and "List area" occupies most of the right part of the operable webpage. Functional buttons "Browse (Material Upload)" and "Browse (Template Upload)" of the operable webpage of lobby interface 810 receive operating commands from users, to select materials or templates stored in first/second user terminal 1A/1B; and then upload module 820 performs a corresponding upload process to upload the selected materials or templates of first/second user terminal 1A/1B to template database 840 or material database 860 of exchange server 800.

When any of the functional buttons, such as Material Download buttons (Image Material, Audio Material, Video Material, 3D map [Material], 3D Scene object [Material], 3D Character [Material]) or Template Download buttons (Category Menu, Grade Menu, Theme Menu) at the left part is clicked, the corresponding materials or templates stored in template database 840 or material database 860 are retrieved by managing module 830 and listed in the List Area. When any of these listed materials or templates is selected, managing module 830 starts to perform a download process and download the selected material or template to first/second user terminal 1A/1B.

Figure 1C:
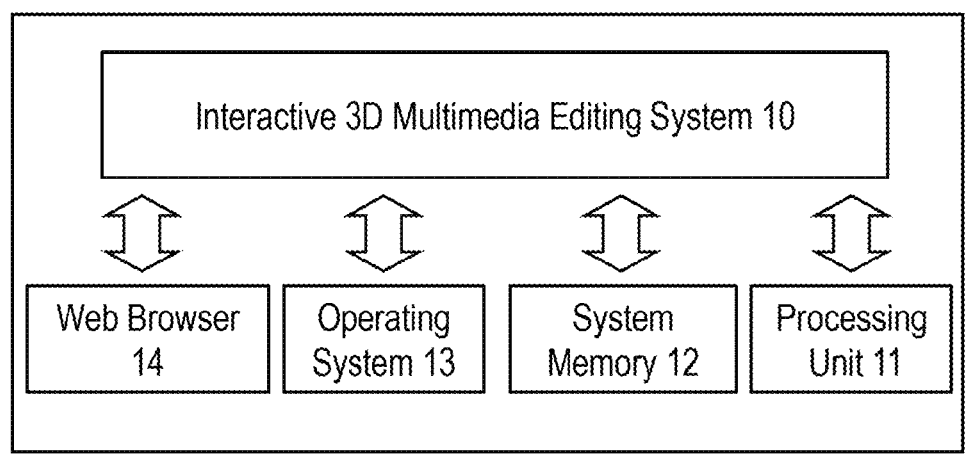
FIG. 1C is a system diagram of (first/second) user terminal according to another embodiment.

Please refer to FIG. 1C, which is a system diagram of (first/second), user terminal according to another embodiment. First/second user terminal 1A/1B is a computer apparatus (such as personal computer, notebook computer, tablet computer, smartphone etc.), mainly including an interactive 3D multimedia editing system 10 for editing interactive 3D multimedia, a processing unit 11 for performing computing processes, a system memory 12 and operating system 13, and a web browser 14 for browsing and accessing lobby interface 810. The detailed structure of interactive 3D multimedia editing system 10 is further explained in the following sections.

Figure 1D:
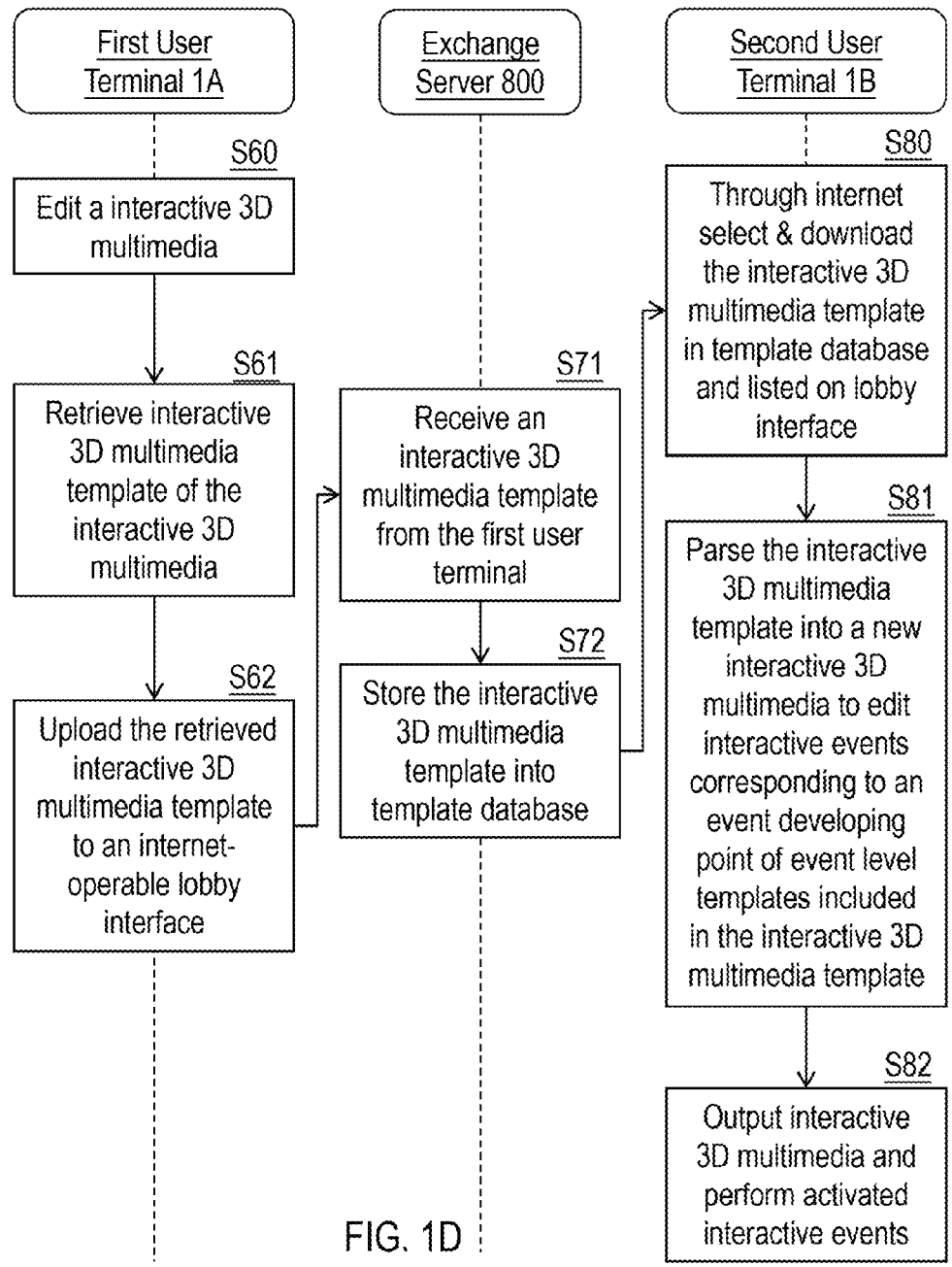
FIG. 1D is a flow chart of online edit and exchanging method for interactive 3D multimedia according to another embodiment.

Please refer to FIG. 1D, which is a flow chart of online edit and exchanging method for interactive 3D multimedia according to another embodiment. Although the online editing and exchanging method for interactive 3D multimedia is introduced through the flow chart, the method sections do not not need to be followed exactly as the sequence shown in the drawing or in the descriptions below.

(1) Interactive 3D Multimedia Editing System

Step S60: Edit an interactive 3D multimedia. A first user is able to edit a set of "interactive 3D multimedia" through interactive 3D multimedia editing system 10 of first user terminal 1A.

Step S61: Extract an "interactive 3D multimedia template" of the interactive 3D multimedia. Since each of first/second user terminal 1A/1B has an interactive 3D multimedia editing system 10 installed respectively thereon, not all the materials used in the interactive 3D multimedia are necessary to be uploaded for exchanging. Consequently, in another embodiment, the "interactive 3D multimedia template" includes only a set of "pre-edited material settings" and one or more "pre-edited event level templates" of the interactive 3D multimedia.

Step S62: Upload the extracted interactive 3D multimedia template to an internet-operable lobby interface. Through web browser 14 of first user terminal 1A, the user is able to access lobby interface 810 of exchange server 800 to start a upload process from the webpage in FIG. 1B.

(2) Exchange Server

First of all, exchange server 800 provides a lobby interface 810 accessible and operable through the internet so users are able to online operate the webpages of lobby interface 810.

Step S71: Receive an interactive 3D multimedia template from the first user terminal. Upload module 820 of exchange server 800 is able to receive an interactive 3D multimedia template from first user terminal 1A according to a first user command.

Step S72: Store the interactive 3D multimedia template into template database. The interactive 3D multimedia template received by upload module 820 of exchange server 800 is stored into template database 840 of exchange server 800.

(3) Second User Terminal

Step S80: through the internet select and download the interactive 3D multimedia template stored in the template database and listed on the lobby interface. Second user terminal 1B is able to access lobby interface 810 of exchange server 800 by its web browser 14 navigating through the internet. On one of the operable webpages (such as the one shown in FIG. 1B), of lobby interface 810, a second user is able to select among category menu, grade menu or theme menu, and then the interactive 3D multimedia template shared from the first user terminal 1A and stored in template database 840 is shown in the List Area of FIG. 1B. The second user is able to select this interactive 3D multimedia template and download to the second user terminal 1B.

Step S81: Parse the download interactive 3D multimedia template into a new interactive 3D multimedia to edit interactive events corresponding to an event developing point of event level templates included in the interactive 3D multimedia template. The second user terminal 1B is able to "parse" the downloaded interactive 3D multimedia template by its interactive 3D multimedia editing system 10; the parse process includes establishing a new interactive 3D multimedia (file), and stores the pre-edited material settings and pre-edited event level templates of the interactive 3D multimedia template into the new interactive 3D multimedia. The new interactive 3D multimedia is therefore editable through the interactive 3D multimedia editing system 10 of second user terminal 1B. The parse process above is performed by an event editing module 250 of interactive 3D multimedia editing system 10; refer to FIG. 1E and related descriptions. Namely, event editing module 250 is able to parse the downloaded interactive 3D multimedia template to edit interactive events corresponding to an event developing point in accordance with second user commands.

Step S82: Output interactive 3D multimedia and perform activated interactive events. The new interactive 3D multimedia edited by the interactive 3D multimedia editing system 10 of second user terminal 1B is output or executed by the interactive 3D multimedia editing system 10; those interactive events included in the interactive 3D multimedia is activated during executing the new interactive 3D multimedia.

In another embodiment, a computer-readable storage medium is adapted to store multiple computer-executable commands; when these commands are executed, a method for online editing and exchanging interactive 3D multimedia is executed. The method for online editing and exchanging interactive 3D multimedia includes the following sections. First of all, an exchange server provides an internet-operable lobby interface and a template database. The template database stores uploaded interactive 3D multimedia templates of a pre-edited interactive 3D multimedia. Here the interactive 3D multimedia is pre-edited on a first user terminal according to a first user command and the interactive 3D multimedia template includes one or more pre-edited event level template. The pre-edited event level template further includes one or more event series levels; and each of the event series levels includes event developing points. According to a second user command from a second user terminal, the pre-edited interactive 3D multimedia template is selected and downloaded. The pre-edited interactive 3D multimedia template is then parsed and interactive events corresponding to event developing points included in the pre-edited interactive 3D multimedia template are further edited according to the second user command. Afterwards, establish interactive relevances between the interactive events and materials stored in the second user terminal 1B. Output the interactive 3D multimedia with the materials, and execute the interactive events activated during outputting the interactive 3D multimedia. Such computer-readable storage medium is realized by compact discs, memory cards, portable flash memory and databases downloadable through private/public network.

Figure 12:
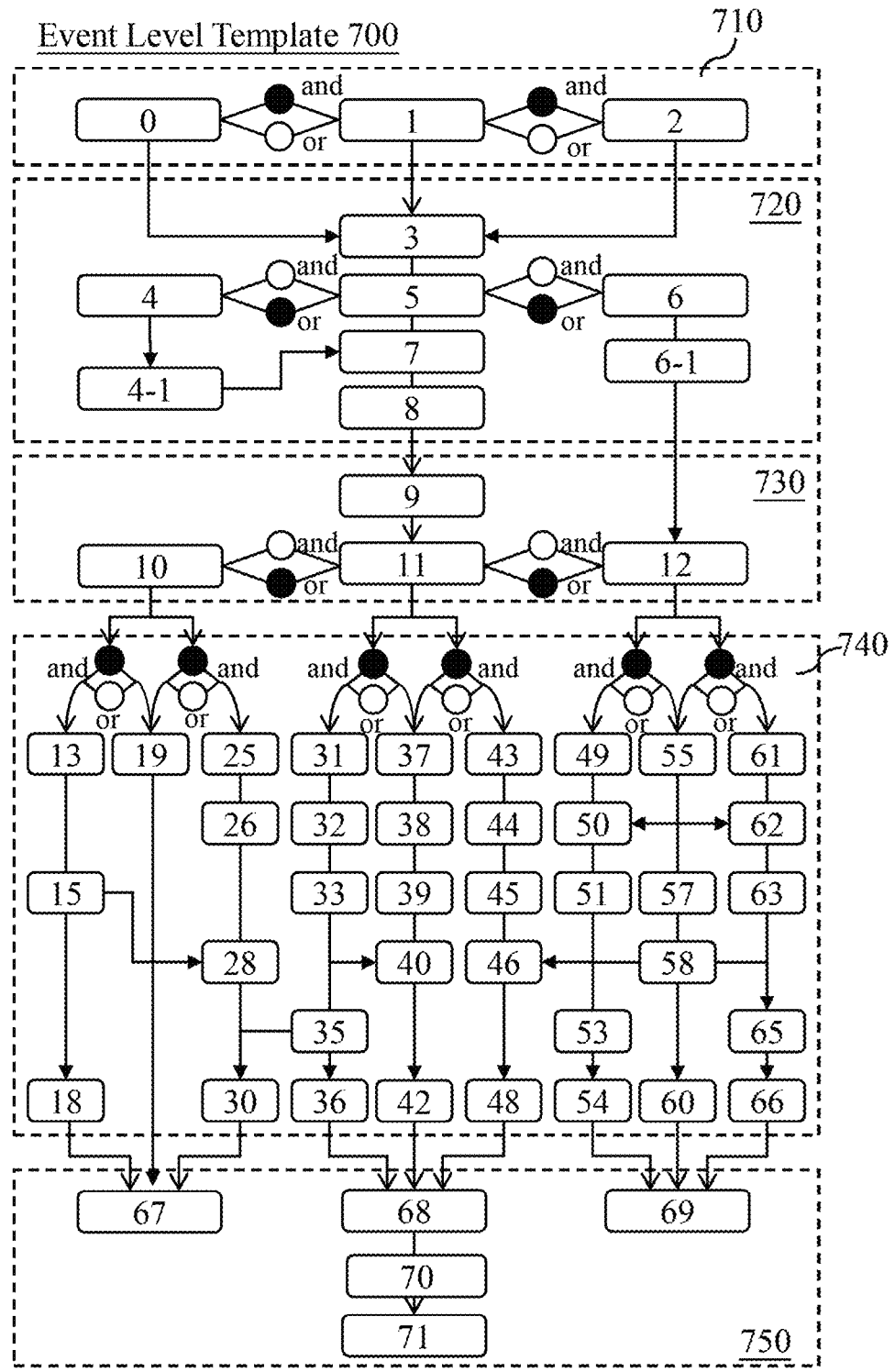
FIG. 12 is an explanatory diagram of a script type event level template according to another embodiment.
Figure 13:
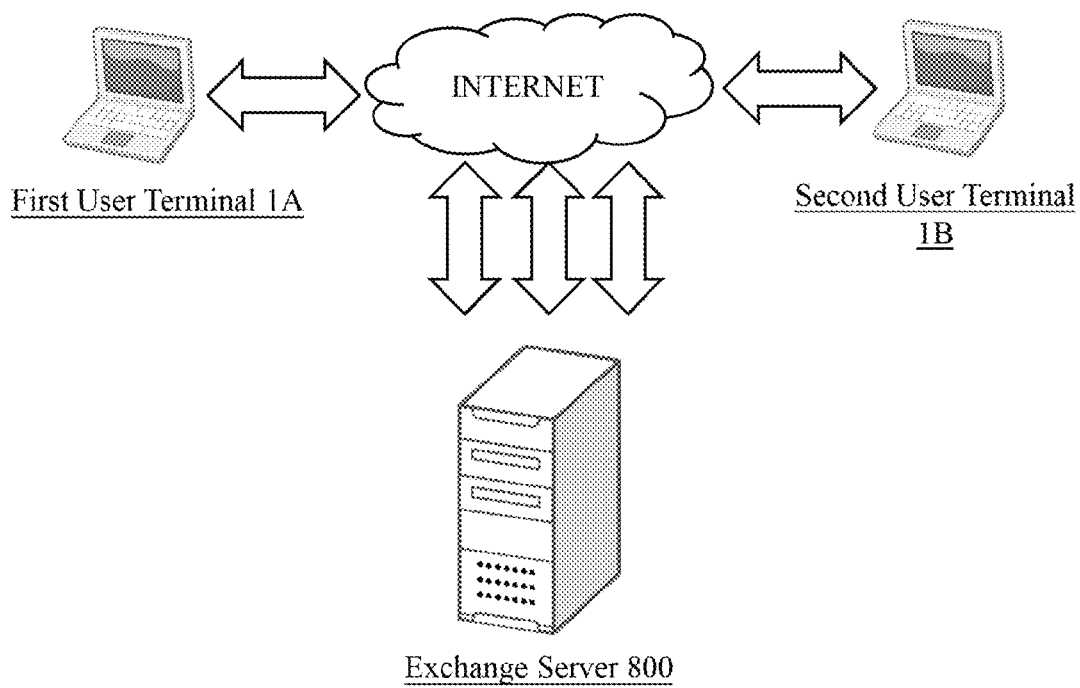
FIG. 13 is a systematic diagram of an architecture for online editing and exchanging interactive 3D multimedia according to another embodiment.
Figure 14:
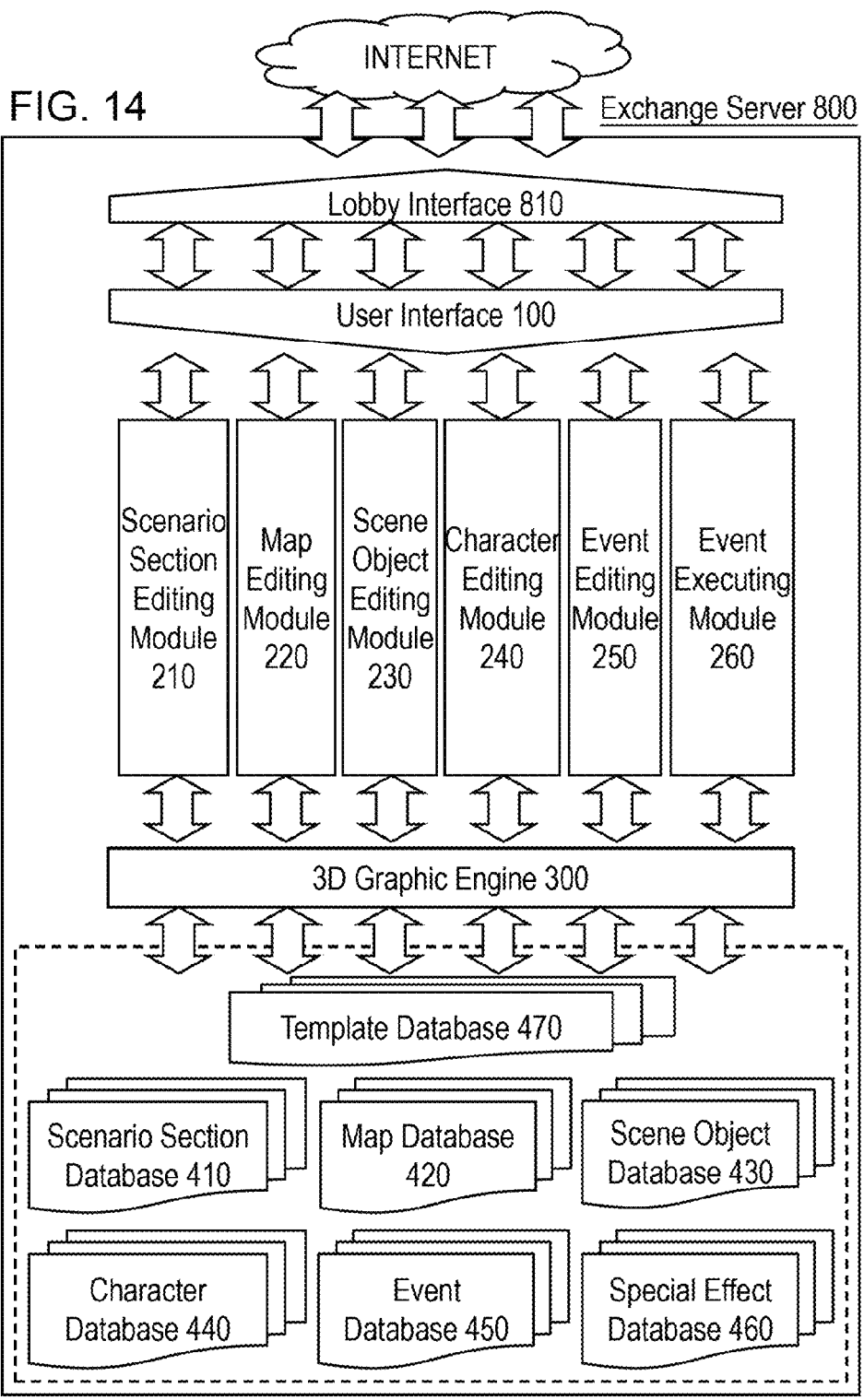
FIG. 14 is a systematic diagram of an exchange server according to another embodiment.
Figure 15:
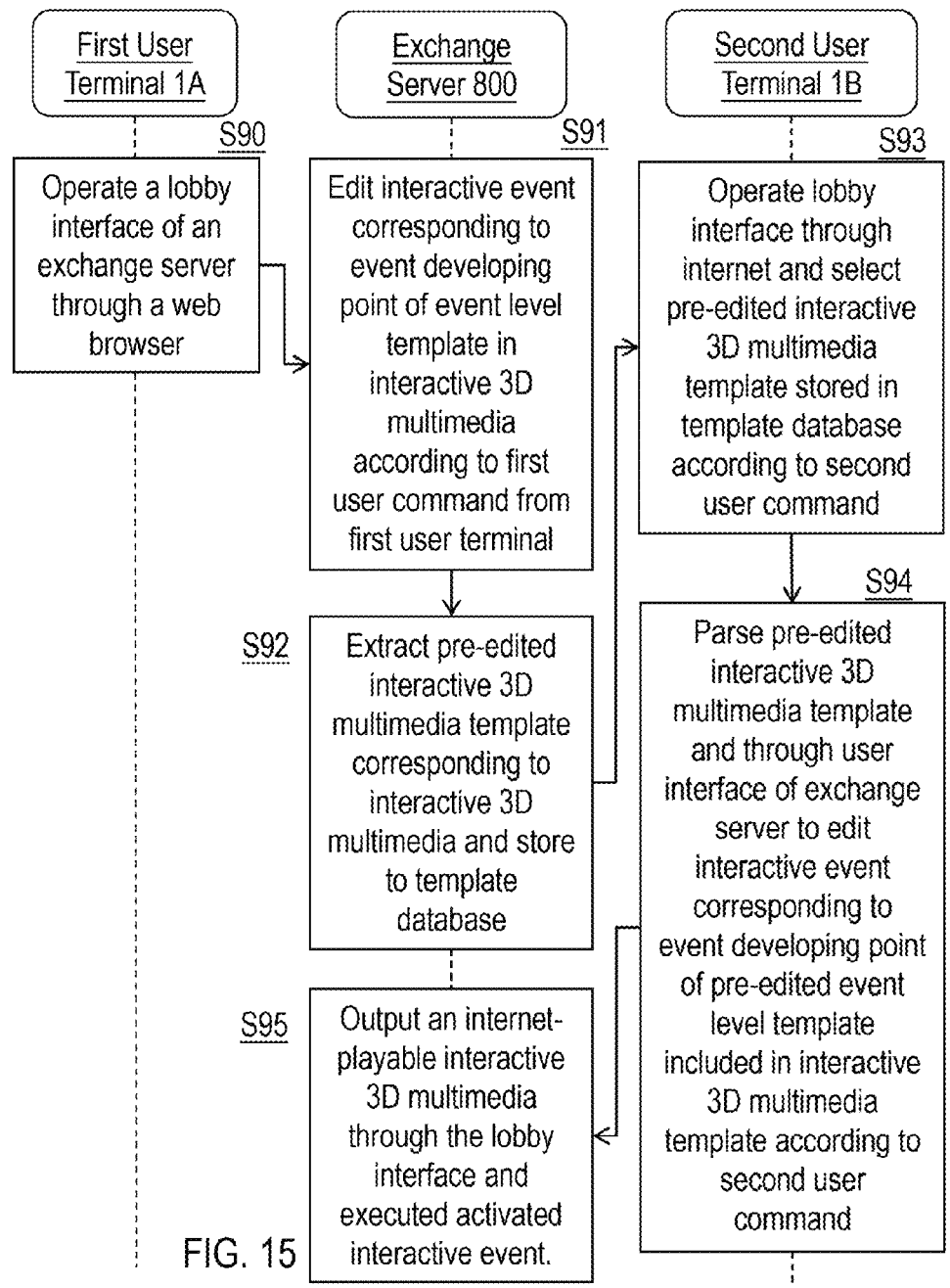
FIG. 15 is a flowchart of a method for online editing and exchanging interactive 3D multimedia according to another embodiment.

Aside from using the user terminals disclosed in FIG. 1A-1D as an editing host system and using the exchange server to provide a sharing and exchanging mechanism, the architecture and method for online editing and exchanging interactive 3D multimedia according to another embodiment, is able to combine the editing and exchanging functions for interactive 3D multimedia together on a single host system, such as the exchange server; as shown in FIG. 13-15 and the related descriptions. However, before FIG. 13-15 is introduced further, please refer to FIG. 1E-12 and the corresponding descriptions; a system and method for editing interactive 3D multimedia is provided in the following sections to sufficiently disclose how the interactive 3D multimedia is edited and the relevances between such editing system/method and the user terminals and the exchange server.

Figure 1E:
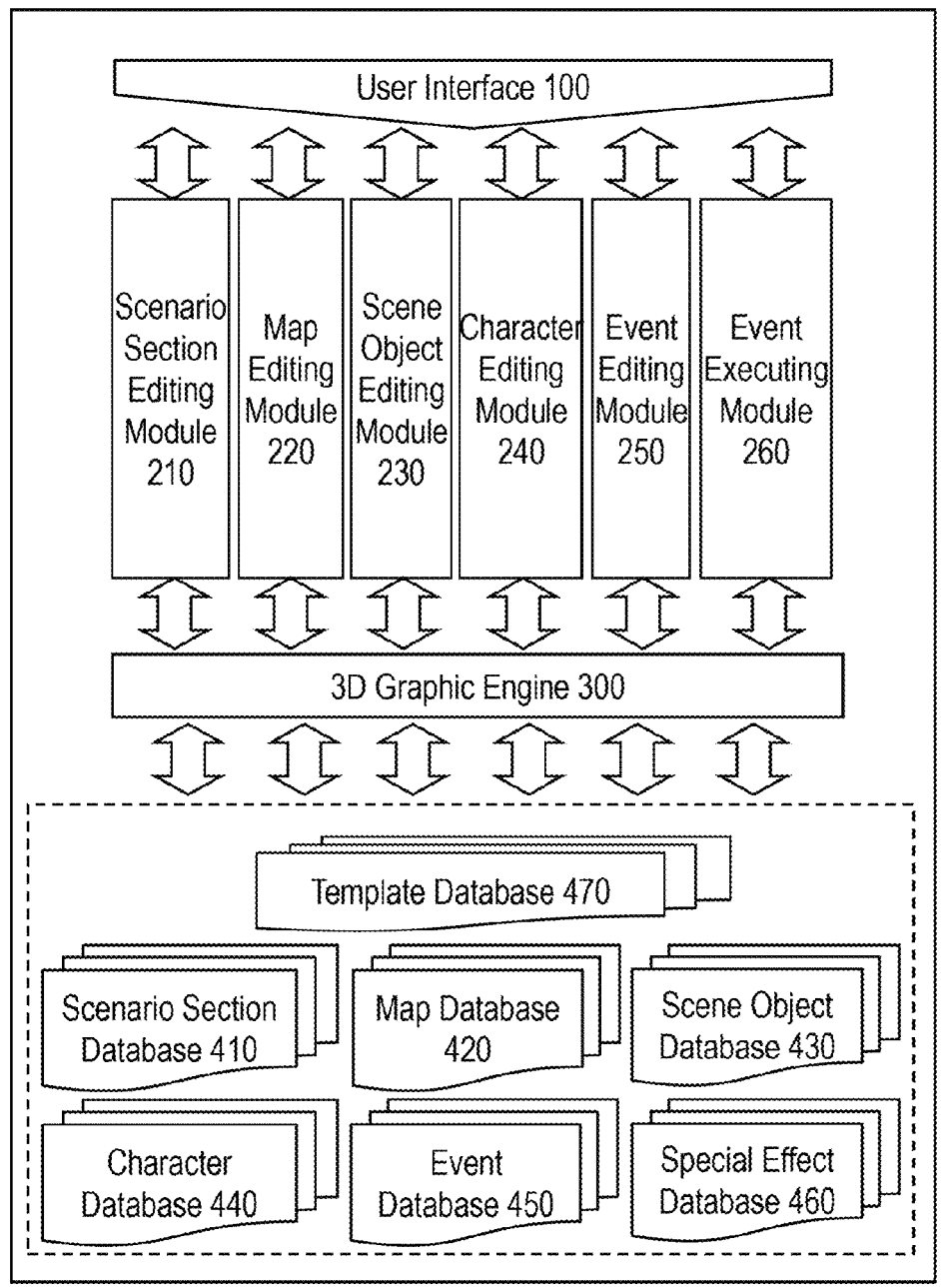
FIG. 1E is a system block diagram of a system for editing interactive 3D multimedia according to another embodiment.

Please refer to FIG. 1E, which is a system block diagram of a system for editing interactive 3D multimedia according to another embodiment. Interactive 3D multimedia editing system 10 is realized by a computer system executing special commands or procedures; such computer system mainly includes a central processing unit (CPU), system memory and necessary buses. Interactive 3D multimedia editing system 10 mainly includes a user interface 100, several modules (including scenario section editing module 210, map editing module 220, scene object editing module 230, character editing module 240, event editing module 250 and event executing module 260), 3D graphic engine 300 and several databases (including scenario section database 410, map database 420, scene object database 430, character database 440, event database 450 and special effect database 460).

User interface 100 is a window operation interface displayable on a computer screen or other display apparatuses. User interface 100 provides multiple operation pages/windows operable by the user inputting commands through peripheral input devices (such as indicating device [mouse], keyboard and/or touch screen). The displayable and operable user interface 100 is adapted for the user to edit interactive 3D multimedia. An "interactive 3D multimedia" includes multiple specific computer-executable event procedures and multiple computer-playable video and/or audio data corresponsive to the event procedures. According to user commands, the interactive 3D multimedia is executed and perform one or more specific event procedures and play back (or output), corresponsive video and/or audio data. In the disclosure, a computer system is realized by a personal computer, notebook computer, tablet computer or smartphone.

Scenario section editing module 210 provides one or more set of scenario section information displayable on user interface 100. According to user commands received from the user interface 100, scenario section editing module 210 also selects a scenario section of an "interactive 3D multimedia" for further editing. In another embodiment, scenario section editing module 210 provides a new scenario section for the user to start editing. Scenario section editing module 210 is realized by the above-mentioned computer system executing specific related procedures in the background environment (namely executed by the computer, though at least partial tasks are not shown on the screen and display to the user). Scenario section database 410 stores one or more scenario section materials, which are provided to the user to operate and select through the user interface 100 and scenario section editing module 210. Scenario section materials is selected from the group consisting 3D map materials, 3D scene object materials, 3D character materials, image effect materials, audio effect materials and event materials and any combination thereof, which is able to further include the group consisting of image data and map sound data corresponding to these materials and any combination thereof.

Map editing module 220 provides one or more set of map information displayable on user interface 100. According to the user commands received from user interface 100, map editing module 220 selects 3D map materials applicable to a set of certain interactive 3D multimedia. In another embodiment, map editing module 220 provides a set of new 3D map materials for the user to start editing. Map editing module 220 is realized by the formerly mentioned computer executing specific related procedures. Map database 420 stores one or more 3D map materials, which allow the user to operate and select through the user interface 100 and map editing module 220. Here 3D map materials are selected from the group consisting of map image data and map sound data.

Scene object editing module 230 provides one or more set of scene object information displayable on user interface 100. According to the user commands received from user interface 100, scene object editing module 230 selects from the existing 3D scene object materials applicable to a certain set of "interactive 3D multimedia". In another embodiment, scene object editing module 230 provides a new set of 3D scene object materials for the user to start editing. Scene object editing module 230 is realized by the formerly mentioned computer system executing specific related procedures in the background environment. Scene object database 430 stores plural 3D scene object materials for the user to operate and select through user interface 100 and scene object editing module 230. Here 3D scene object materials are selected from the group consisting of scene object image data and scene object sound data and any combination thereof.

Character editing module 240 provides one or more sets of character setting information displayable on the user interface 100. According to the user commands received from user interface 100, character editing module 240 selects a character for a certain set of "interactive 3D multimedia" to edit the settings of the selected character. In another embodiment, character editing module 240 provides a new set of 3D character materials for the user to start editing. Character editing module 230 is realized by the formerly mentioned computer system executing specific related procedures in the background environment. Character database 440 stores one or more 3D character materials for the user to operate and select through user interface 100 and character editing module 240. Here 3D character materials are selected from the group consisting of character image data and character sound data and any combination thereof.

Special effect database 460 stores the materials selected from the group consisting of image effect materials and sound effect materials and any combination thereof.

Event editing module 250 provides one or more sets of event setting information displayable on user interface 100. According to the user commands received from user interface 100, event editing module 250 selects an event in a certain set of "interactive 3D multimedia" to edit the settings of the selected event. Event editing module 250 is realized by the formerly mentioned computer system executing specific related procedures in the background environment. Furthermore, event editing module 250 provides one or more "event level template". Each event level template includes one or more "event series level"; and each event series level includes one or more "event developing point". Such framework is designed for easily editing the interactive event(s) regarding to a selected character at certain event developing points. To further disclose the interactive event and the event level template(s), event developing point(s) and event series level(s), please refer to FIGS. 9, 11, 12 and the related descriptions. In event database 450, one or more event materials are stored therein for the user to operation and select through user interface 100 and event editing module 250. In another embodiment, the user is allowed to create new event materials by operating and editing through user interface 100 and event editing module 250, and then store them in event database 450.

3D graphic engine 300 is realized by the formerly mentioned computer system executing multiple graphic processing procedures with or without audio processing procedures. Here 3D graphic engine 300 establishes the interactive relevances between the interactive events and various materials stored in the above-mentioned databases. Therefore, when the system is executing the interactive 3D media and an interactive event is activated, 3D graphic engine 300 is able to call and execute the corresponding graphic processing procedures with or without audio processing procedures, especially graphic overlaying procedures of multiple visible image/video materials.

Through 3D graphic engine 300, event executing module 260 is able to output the interactive 3D multimedia edited by those different editing modules mentioned previously. According to the user commands received from user interface 100, event executing module 260 executes the interactive events of the interactive 3D media corresponding to the aforesaid different event developing points. In another embodiment, through 3D graphic engine 300, event executing module 260 plays back 3D map materials, 3D scene object materials, 3D character materials, image effect materials, sound effect materials corresponding to an interactive events at a certain scenario section of an interactive 3D multimedia, including graphic overlaying of multiple visible image/video materials.

Figure 2:
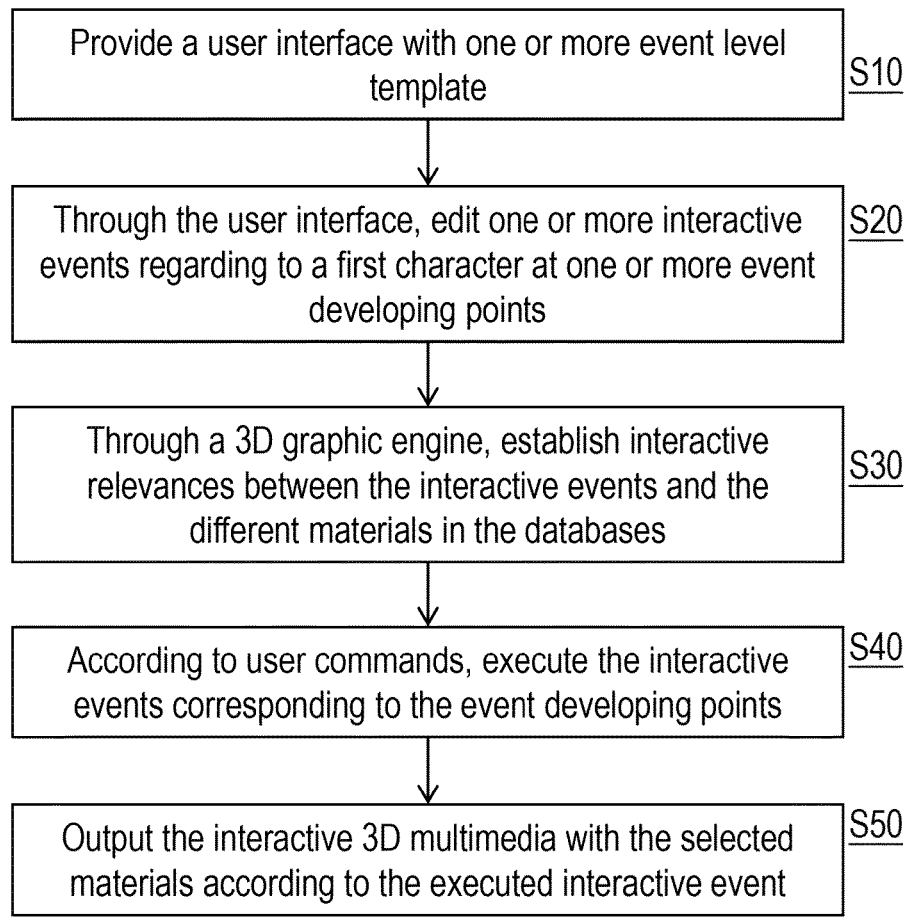
FIG. 2 is a flowchart of a method for editing interactive 3D multimedia according to another embodiment.

Please refer to FIG. 2, which is a flowchart of a method for editing interactive 3D multimedia according to another embodiment. Although the embodiment introduces examples based on the flowchart, the method of editing interactive 3D multimedia is not limited to the steps and sequences of the flowchart.

Step S10: Provide a user interface with one or more event level template. Through the interactive 3D multimedia editing system 10 in FIG. 1E, user interface 100 is provided. Event level template includes one or more event series levels, and each of event series levels includes one or more event developing points.

Step S20: Through the user interface, edit one or more interactive events regarding to a first character at one or more event developing points. The user is able to input user commands through the user interface 100 in FIG. 1E, so as to edit the first character and related interactive events in the interactive 3D multimedia through character editing module 240 and event editing module 250. The user is also able to operate through user interface 100 and scenario section editing module 210, map editing module 220 and scene object editing module 230 to edit and select scenario section materials, 3D map materials, and 3D scene object materials (respectively stored in scenario section database 410, map database 420 and scene object database 430) of the interactive 3D multimedia.

Step S30: Through a 3D graphic engine, establish interactive relevances between the interactive events and the different materials in the databases. During the process of editing and selecting different materials of the interactive 3D multimedia, 3D graphic engine 300 is used to establish the interactive relevances between the interactive events and selected materials stored in scenario section database 410, map database 420, scene object database 430, character database 440 and special effect database 46. Accordingly, when any of the interactive events of the interactive 3D multimedia is executed later, the graphic processing procedures and sound processing procedures of all selected materials are called for execution and playback (on a computer screen or display apparatus of the computer system).

Step S40: According to user commands, execute the interactive events corresponding to the event developing points. When executing the interactive 3D multimedia, the user commands are input into the system to execute the interactive events corresponding to the event developing points, so through the 3D graphic engine 300, the system calls the graphic processing procedures and sound processing procedures of selected materials at the right timings (based on the interactive events) for execution and playback.

Step S50: Output the interactive 3D multimedia with the selected materials according to the executed interactive event. The executing results or outputs of the interactive 3D multimedia include playing back and presenting (on a computer screen or display apparatus of the computer system), of the selected materials at the right timings of interactive events through 3D graphic engine 300.

Figure 3:
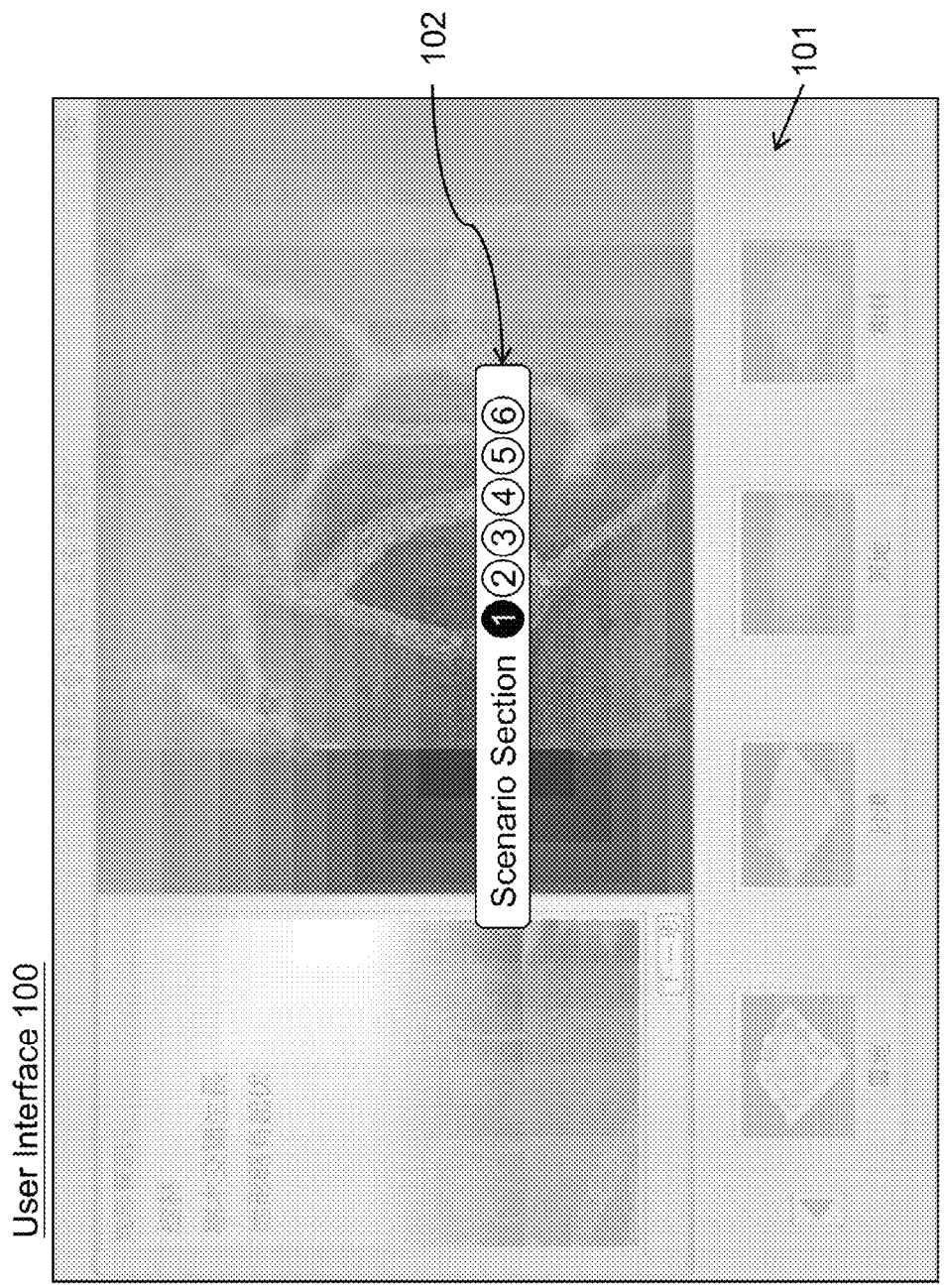
FIG. 3 is an actual picture of a user interface of an interactive 3D multimedia editing system according to another embodiment.

Please jointly refer to FIG. 3 and the embodiments mentioned previously. FIG. 3 is an actual picture of a user interface of an interactive 3D multimedia editing system according to another embodiment. In the present embodiment, scenario section editing module 210 of the interactive 3D multimedia editing system is executed by the computer system in the background environment, such that user interface 100 is displayed on a computer screen (or any other display apparatus), and is in an editable mode for selection of scenario section materials. In FIG. 3, scenario section editing module 210 overlays a semitransparent mask 101 on the top of user interface 100. Such semitransparent mask 101 has a scenario section materials selecting window 102 with six numbers (each represents a scenario section material) circled thereon. When the user inputs a user command (through a computer mouse for example) and select a scenario section materials (for example, number "1" is selected and highlighted), then the system enters the following editing stages. In comparison with the interactive 3D multimedia editing method in FIG. 2, the present embodiment further includes providing a semitransparent mask 101 overlaying the top of user interface 100, and providing a scenario section materials selecting window 102 on the semitransparent mask 102.

Figure 4:
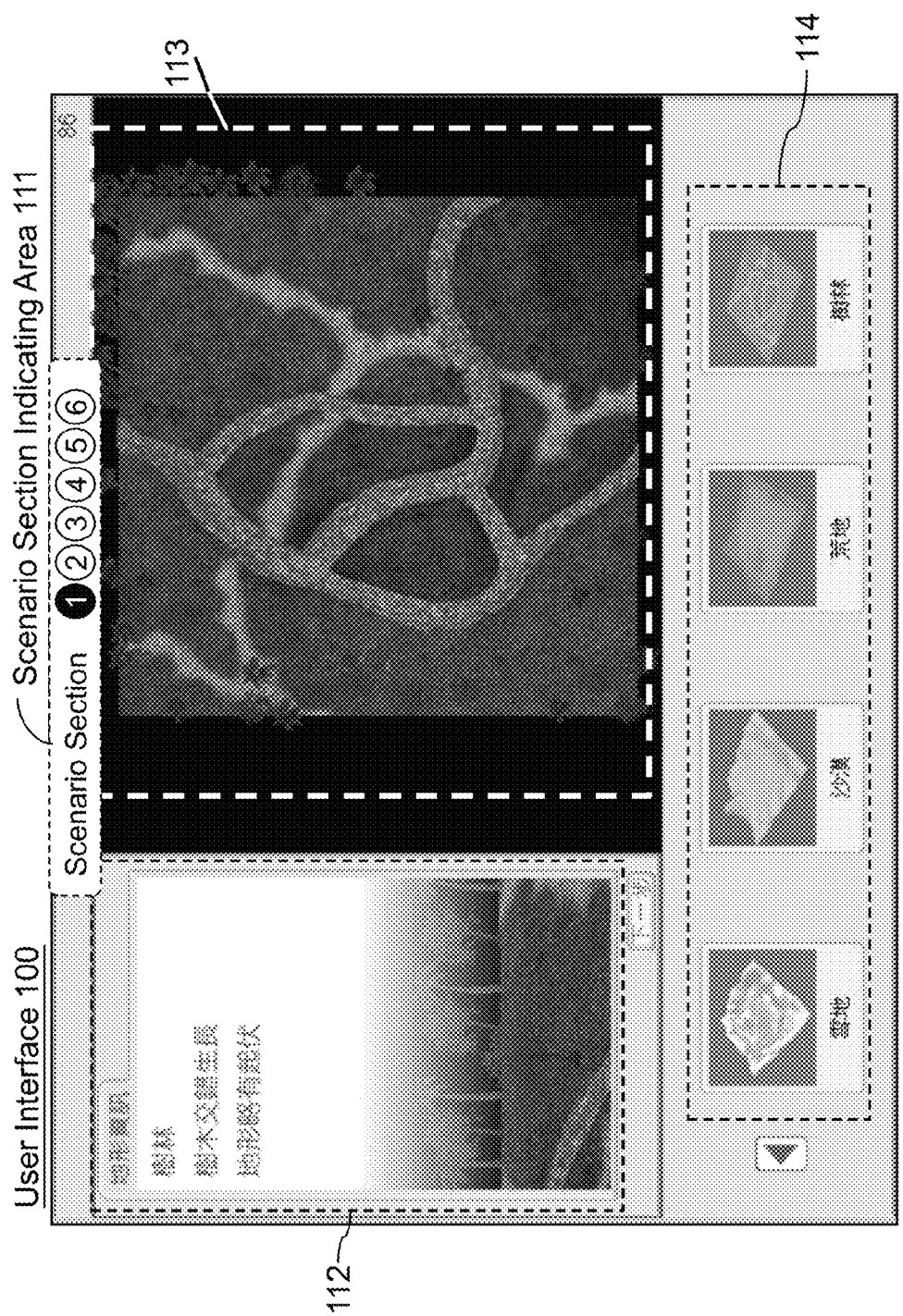
FIG. 4 is an actual picture of a user interface of an interactive 3D multimedia editing system according to another embodiment.

Please jointly refer to FIG. 4 and the embodiments mentioned previously. FIG. 4 is an actual picture of a user interface of an interactive 3D multimedia editing system according to another embodiment. In the present embodiment, map editing module 220 of the interactive 3D multimedia editing system is executed in the background environment by the computer system, such that the user interface 100 is displayed on a display apparatus and is in an editable mode for selection of 3D map materials. During this stage, user interface 100 mainly includes a scenario section indicating area 111, landform information area 112, map preview area 113 and map selection area 114. Scenario section indicating area 111 is located at the middle top side of user interface 100; the highlighted number indicates the scenario section material that is currently under editing. Landform information area 112 is located at the left long narrow section of the user interface 100, providing text descriptions for the selected 3D map material. Map preview area 113 is located at the right top section of user interface 100 and occupying the major space; map preview area 113 instantly displays and shows a reference image of the selected 3D map material. Map selection area 114 is located at the long narrow bottom section of user interface 100, showing multiple snapshots corresponding to different 3D map materials for user selection. When the user inputs a user command and selects one of 3D map materials within map selection area 114, landform information area 112 instantly shows the text descriptions corresponding to the selected 3D map materials; meanwhile, map preview area 113 displays an enlarged reference image of the selected 3D map material. In comparison with the interactive 3D multimedia editing method in FIG. 2, the present embodiment further includes providing multiple 3D map materials on the user interface for selecting by the user, displaying text descriptions of the selected 3D map materials, and providing an enlarged image of the selected 3D map materials.

Figure 5:
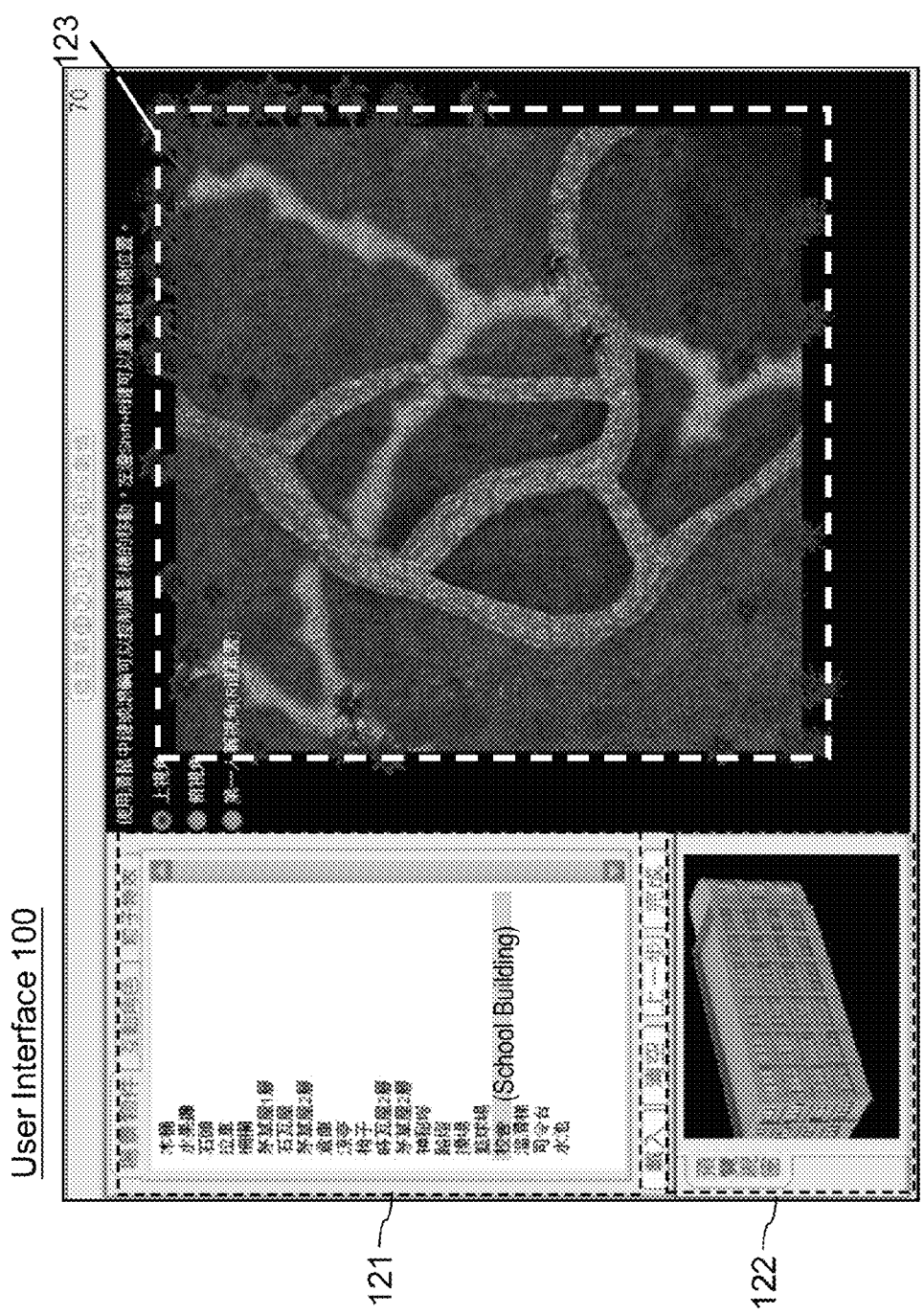
FIG. 5 is an actual picture of a user interface of an interactive 3D multimedia editing system according to another embodiment.

Please jointly refer to FIG. 5 and the embodiments mentioned previously. FIG. 5 is an actual picture of a user interface of an interactive 3D multimedia editing system according to another embodiment. In the present embodiment, scene object editing module 230 of interactive 3D multimedia editing system 10 is executed in the background environment by the computer system, such that user interface 100 is displayed on a display apparatus and is at an editable or operable mode for editing 3D scene object materials. Here user interface 100 mainly includes a scene object selecting area 121, a scene object preview area 122 and an overall preview area 123. Here scene object selecting area 121 is located at the left, long narrow upper space of the user interface 100; multiple 3D scene object materials are listed by text in scene object selecting area 121 for user selection. Scene object preview area 122 is located at the left lower section of user interface 100, displaying a preview image of the selected one of 3D scene object materials that is selected via operation of user interface 100 and scene object selecting area 121. In FIG. 5, "school building" in scene object selecting area 121 is selected and highlighted so in object preview area 122, a preview image of the "school building" is displayed. Overall preview area 123 is located at the whole right section of user interface 100, displaying a select scene object with a relative size at a movable location on a selected 3D map material in the former stage. In another embodiment, after the user selects one of 3D scene object materials, the selected 3D scene object material is shown on the 3D map material in overall preview area 123;

according to user commands, the location of the selected 3D scene object material is movable to different relative locations on an enlarged image of the selected 3D map material. In comparison with the interactive 3D multimedia editing method of FIG. 2, the embodiment further includes providing multiple 3D scene object materials on the user interface for user selection, displaying a preview image corresponding to the selected 3D scene object material, displaying the selected 3D scene object material overlaying the selected 3D map material upon the user interface, and according a user command moving the selected 3D scene object material to a relative location on an enlarged image of the selected 3D map material.

Figure 6:
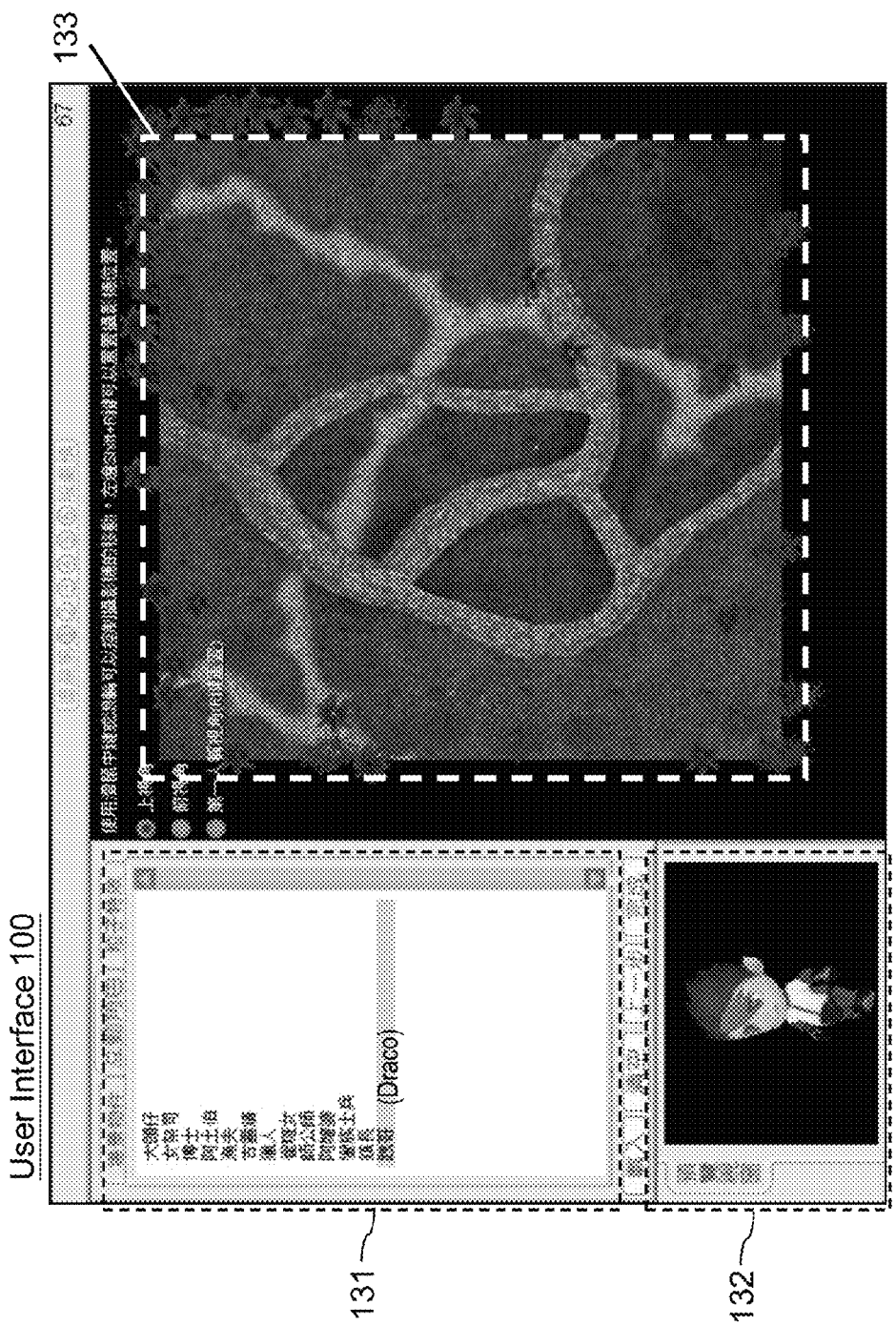
FIG. 6 is an actual picture of a user interface of an interactive 3D multimedia editing system according to another embodiment.

Please jointly refer to FIG. 6 and the embodiments mentioned previously. FIG. 6 is an actual picture of a user interface of an interactive 3D multimedia editing system according to another embodiment. In the present embodiment, character editing module 240 of interactive 3D multimedia editing system 10 is executed in the background environment by the computer system, such that user interface 100 is displayed on a display apparatus and is at an editable or operable mode for editing 3D character materials. Here user interface 100 mainly includes a character selecting area 131, a character preview area 132 and an overall preview area 133. Character selecting area 131 is located at the left upper long narrow space of user interface 100, listing multiple 3D character materials by text descriptions for user selection via user commands. Character preview area 132 is located at the left lower section of user interface 100, displaying a preview image of the selected one of 3D character materials that is selected form character selecting area 121. The overall preview area 133 is located at the whole right section of user interface 100, mainly displaying the enlarged image of the selected 3D map materials. In FIG. 6, a 3D character material "Draco" is selected and highlighted in character selecting area 131; a preview image of 3D character material "Draco" is shown in Character preview area 132. In another embodiment, after 3D scene object materials and/or 3D character materials are selected, both are displayed in overall preview area 133; according to user commands, the relative locations of the selected 3D scene object materials and/or 3D character material on the enlarged image of the previously selected 3D map material are moved. In comparison with the interactive 3D multimedia editing method in FIG. 2, the present embodiment further includes providing multiple 3D character materials for user selection, displaying a preview image of the selected 3D character materials, displaying the selected 3D character materials overlaying the enlarged image of the selected 3D map material, and according to a user command moving a relative location of the 3D character materials on the enlarged image of the selected 3D map material.

As to editing of image effect materials and/or sound effect materials, an effect editing module (not shown), of the interactive 3D multimedia editing system is executed in the background environment by the computer system, such that user interface 100 is displayed on a display apparatus and is at an operable/editable mode for editing image effect materials and/or sound effect materials. Under such mode, the layout of user interface 100 is similar to the ones in FIGS. 5 and 6.

Figure 7:
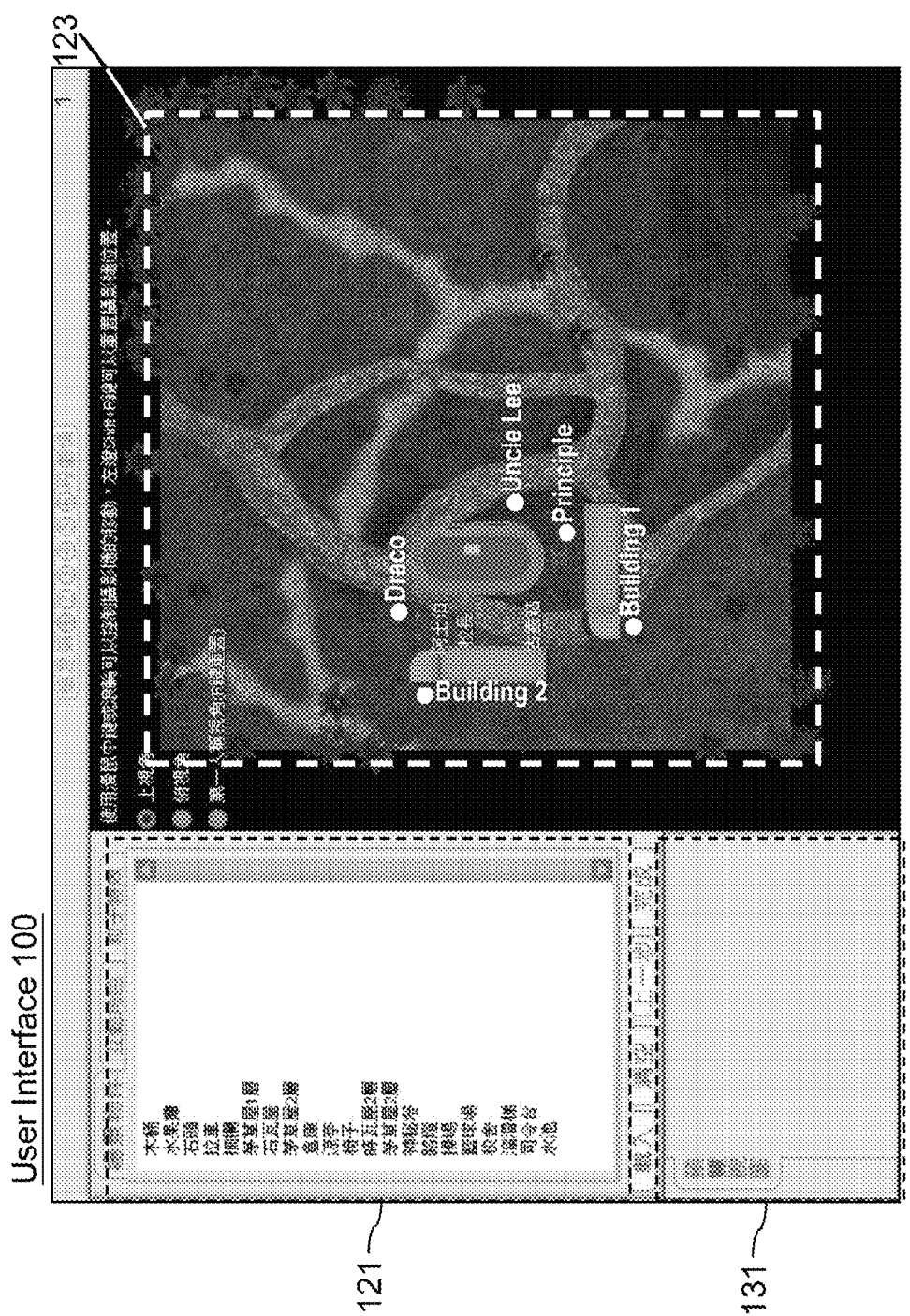
FIG. 7 is an actual picture of a user interface of an interactive 3D multimedia editing system according to another embodiment.

FIG. 7 is an actual picture of a user interface of an interactive 3D multimedia editing system according to another embodiment. In FIG. 7, the editing operations of 3D map materials, 3D scene object materials and 3D character materials are completed; the differences between FIGS. 7 and 5 is that within overall preview area 123 of FIG. 7, the 3D map materials, 3D scene object materials and 3D character materials are shown.

Figure 8:
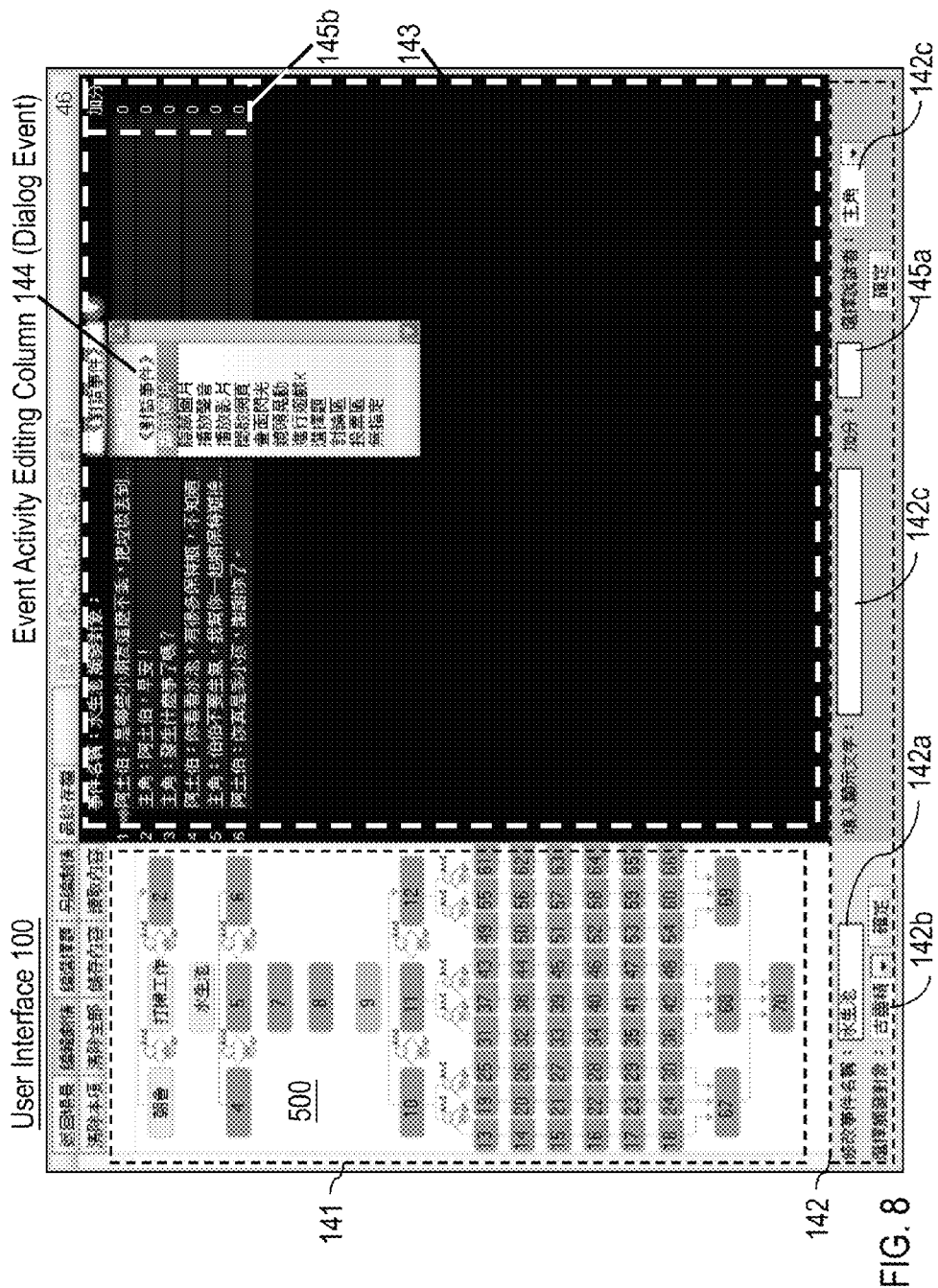
FIG. 8 is an actual picture of a user interface of an interactive 3D multimedia editing system according to another embodiment.

As for the editing operation of interactive event, please refer to FIG. 8, which is an actual picture of a user interface of an interactive 3D multimedia editing system according to another embodiment. In the present embodiment, event editing module 250 of interactive 3D multimedia editing system 10 is executed in the background environment by the computer system, such that user interface 100 is displayed on a display apparatus and is at an editable or operable mode for editing interactive events. Here user interface 100 mainly includes an event level template area 141, an event information area 142 and an event content preview area 143.

Figure 9:
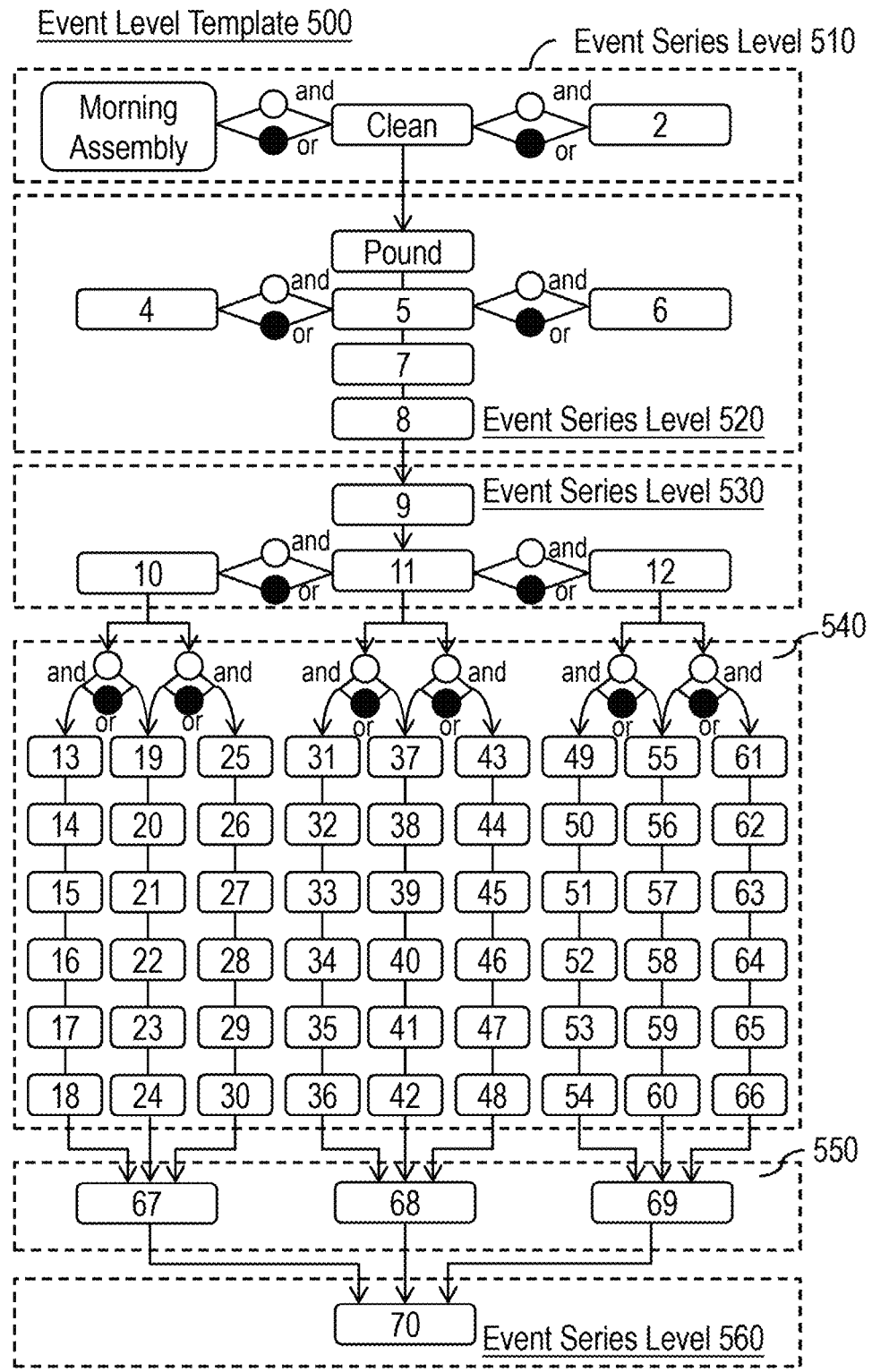
FIG. 9 is an enlarged systematic diagram of the event of the event level template in FIG. 8.

Event level template area 141 is located at the left long narrow space of user interface 100, displaying an event level template 500 for user editing under user commands. Please refer to FIG. 9, which is an enlarge diagram of the event level template in FIG. 8. Event level template 500 includes multiple event series levels (six in FIG. 9; 510/520/530/540/550/560); each of event series levels 510/520/530/540/550/560 includes one or more "event developing points", namely the square columns filed with the titles of interactive events (such as Morning Assembly), or serial numbers (such as "8"), of interactive events, as shown in FIG. 9. Event developing points are adapted to edit one or more interactive events regarding to a selected character (such as Draco); namely, each of the event developing points defines at least an interactive event.

Event information area 142 is located at the left lower section of user interface 100, displaying multiple "event content setting columns" related to a selected event developing point/interactive event, such that the user is able to edit certain settings of event developing points/interactive event. Event content setting column includes "event title" 142*a* (for inputting or amending title of a selected interactive event), "activating target" 142*b* (such as another character or any scene object for activating a certain interactive event), and one or more content editing columns 143*c* for further editing an interactive event. Taking the dialogs included in an interactive event as an example, the content editing columns are able to include dialog input columns, and speaker setting columns (a speaker is defined as a first character or any other character).

Event content preview area 143 is located at the right section of user interface 100, mainly displaying the content or settings of the selected event developing point/interactive event. In another embodiment, the selected event developing points/interactive event is a dialog event, and then the event content preview area 143 shows two or more characters in the dialog event and the dialog contents. Event content preview area 143 is able to further include an event activity editing column 144, which may be realized by a dropdown list including selective items such as "Dialog Events", "Display Image", "Hide Image", "Play Sound", "Play Video", "Open Webpage", "Flash on Screen", "Screen Shaking", "Preset Game", "Multiple-Choice Question", "Forum", "Voting" and "No Activity". In an embodiment regarding educational evaluation purposes, event information area 142 and event content preview area 143 are adapted to provide grading columns 145*a* and 145*b*. As shown in FIG. 8, an interactive event is able to include multiple event activities.

Figure 10:
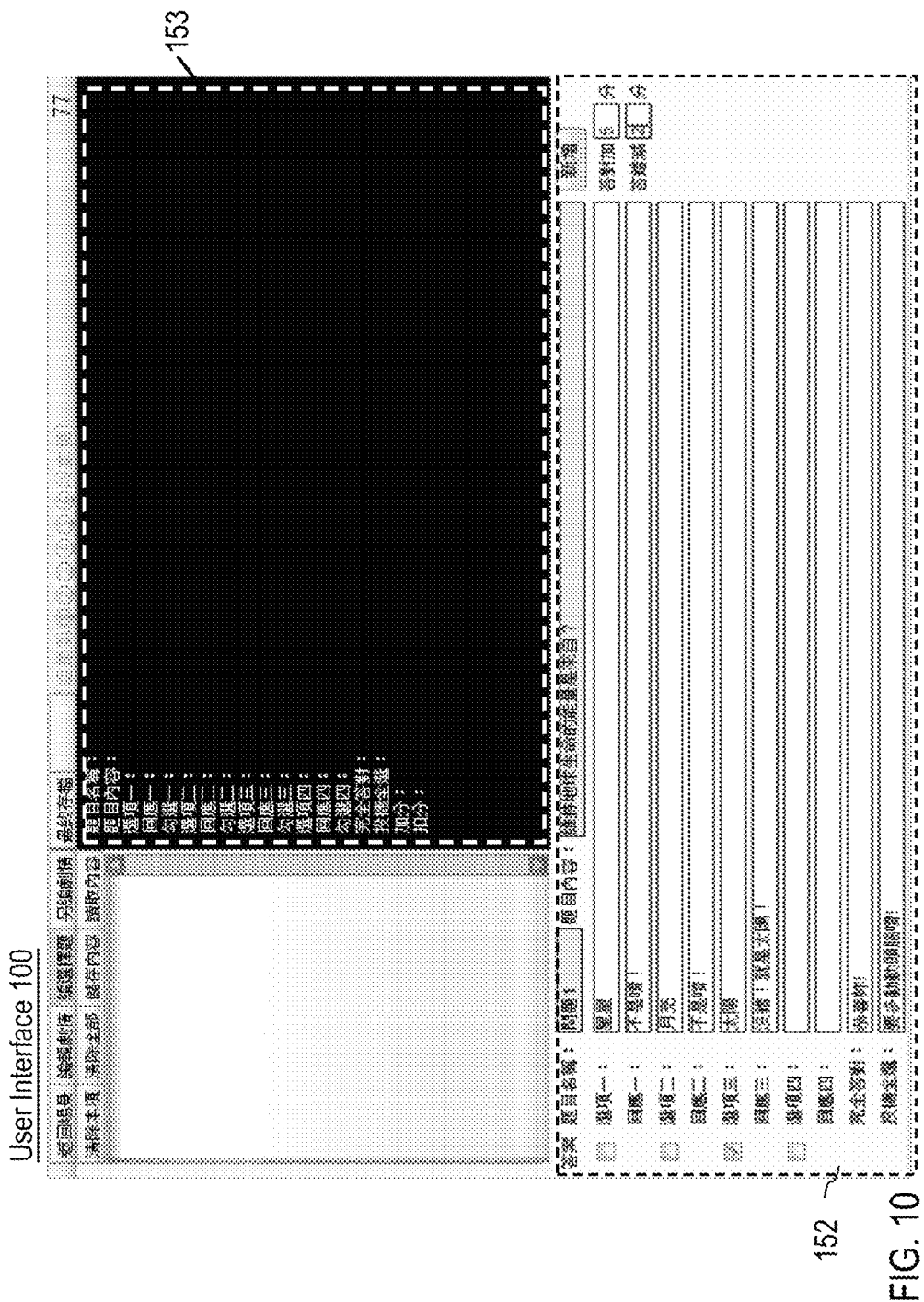
FIG. 10 is an actual picture of a user interface of an interactive 3D multimedia editing system according to another embodiment.

After an event activity in the event activity editing column 144 is selected, different event information areas 142 are provided corresponding to the selected event activity editing column 144 as further editing interfaces. For example, in FIG. 8 event activity editing column 144 is set as a dialog event, so the event setting columns of event information area 142 at the lower section are all related to dialogs. Different suitable editing interface is provided according to the selected event activity. For example, regarding the editing of multiple-choice questions, FIG. 10 shows an event activity preview area 153 with the entire contents of multiple-choice questions listed thereon. An event activity information area 152 at the lower section of user interface 100 provides event activity setting columns directly related to the editing of multiple-choice questions. In FIG. 10, the whole event activity information area 152 becomes an editing interface of an event activity (multiple-choice questions). In short, every event developing point/interactive event is able to include one or more event activities, and on the user interface one or more event activity setting columns are provided for editing the event activities.

In another embodiment, the system and method for editing interactive 3D multimedia provide different event level templates for user selection. For example, an event level template includes a certain amount of event series levels, and each of event series levels has a pre-aligned blank event developing points. Namely, in such event level template, all the alignment relations between event developing points/interactive events are substantially predetermined. The user therefore edits the contents of event developing points/interactive events with a fixed number and pre-aligned framework. In another example, event developing points not only includes a certain number and are pre-aligned, one or more event developing points may also include pre-assigned contents of specific interactive events; yet the rest of event developing points may remain blank. Certainly, theoretically all the event developing points included in an event level template may completely be filled with pre-edited contents of interactive events respectively. Namely, the provided event level template may include at least a blank event developing points. Alternatively, in another condition the event level template may include at least a pre-edited event developing point with pre-edited contents; namely the pre-edited event developing point includes the pre-edited contents of a corresponding interactive event.

In FIG. 9, event level template 500 may provide multiple event developing points of event series levels 510/520/530/540/550/560 with different alignment frameworks; and the differences about alignment frameworks lead to different relations between different groups of interactive events.

The horizontally aligned adjacent event developing points, such as the horizontally aligned adjacent square columns "Morning Assembly" and "Clean", each represents an interactive event with a "Selective Relation" to each other. That is, when the editing processes are finished and the system starts to execute that scenario section of the interactive 3D multimedia, the user need only finish one of the interactive events corresponding to those horizontally aligned adjacent event developing points, such that the user is allowed to enter the next event developing point or the next event series level. For example, to finish one of the interactive events/event developing points "Morning Assembly" and "Clean" at event series level 510 is enough to enter the next level, event series levels 520.

The vertically aligned adjacent event developing points, each represents an interactive event with a "Sequent Relation" to each other. "Sequent Relation" means those vertically aligned adjacent event developing points are related in a certain order with one aligned after another. Such Sequent Relation may be provided according to certain relations between the adjacent events, such as cause-result relation, sequent developing, logical derivation, organizational induction etc. For example, in event series levels 510, as long as one of interactive events "Morning Assembly" and "Clean" is done, the user may enter the interactive event "Pound" at the next event series level 520. Since the interactive event "Morning Assembly" or "Clean" is vertically aligned adjacent to the interactive event "Pound", that means the interactive events defined in event developing points "Morning Assembly" and "Pound" have a Sequent Relation, and similarly the interactive events defined in event developing points "Clean" and "Pound" have a Sequent Relation as well.

However, in different embodiments, according to the layout design of user interface 100, event series levels may be aligned vertically or horizontally. For horizontally aligned event series levels, the adjacent event developing points/interactive event aligned vertically and horizontally may have exactly the opposite definitions from the relations mentioned previously. Therefore, in this disclosure two adjacent event developing points are further defined as "Selective Alignment" or "Sequent Alignment". The two interactive events of two adjacent event developing points with "Selective Alignment" have a Selective Relation to each other. On the other hand, the two interactive events of two adjacent event developing points with "Sequent Alignment" have a Sequent Relation to each other. However, because of the use of AND logic gate, even two selectively aligned adjacent event developing points may both become the inevitable requirements of entering the next event series level/event developing point. The selectively aligned event developing points/interactive events may have AND logic gate and OR logic gate disposed in between; through selecting AND logic gate and OR logic gate between event developing points, the relations between the horizontally aligned adjacent event developing points/interactive events are redefined.

Different event level templates may have different "Specific Developing Logic". Namely, the event developing points of the event series levels may be aligned according to such specific developing logic. For example, in FIG. 9 the event level template may be used to educate students and train their advanced thinking abilities for resolving an issue. The six event series levels 510/520/530/540/550/560 are respectively corresponding to the six ideal steps of resolving an issue. For example, the first step (corresponding to event series level 510), of resolving an issue is to "sense the issue", so the corresponding event developing points in event series level 510 may include specific facts or phenomenons. The second step (corresponding to event series levels 520), is to define the issue, so the corresponding event developing points may include the derivation processes regarding to definition of the issue. The third step to resolve the issue (corresponding to event series levels 530), is to assume several solutions, so the corresponding event developing points may include multiple assumptions for resolving the issue or further classifying the issue. The fourth step, corresponding to event series levels 540, is to develop possible solutions, so the corresponding event developing points may include further information collecting tasks, derivative and investigating tasks of the assumptions. The fifth step corresponding to event series levels 550 is execution results of assumptions or solutions, so the corresponding event developing points may include the results of solution examination or induction. The sixth step corresponding to event series levels 560 is to complete a conclusion, so the corresponding event developing points should include the conclusions produced from the results of event series levels 550. Therefore, each of event series levels 510/520/530/540/550/560 may have their event developing points being aligned according to the requirements of each step for resolving an unknown issue. Furthermore, similar templates may be provided to students as reproducing media of homework or research study.

Figure 11:
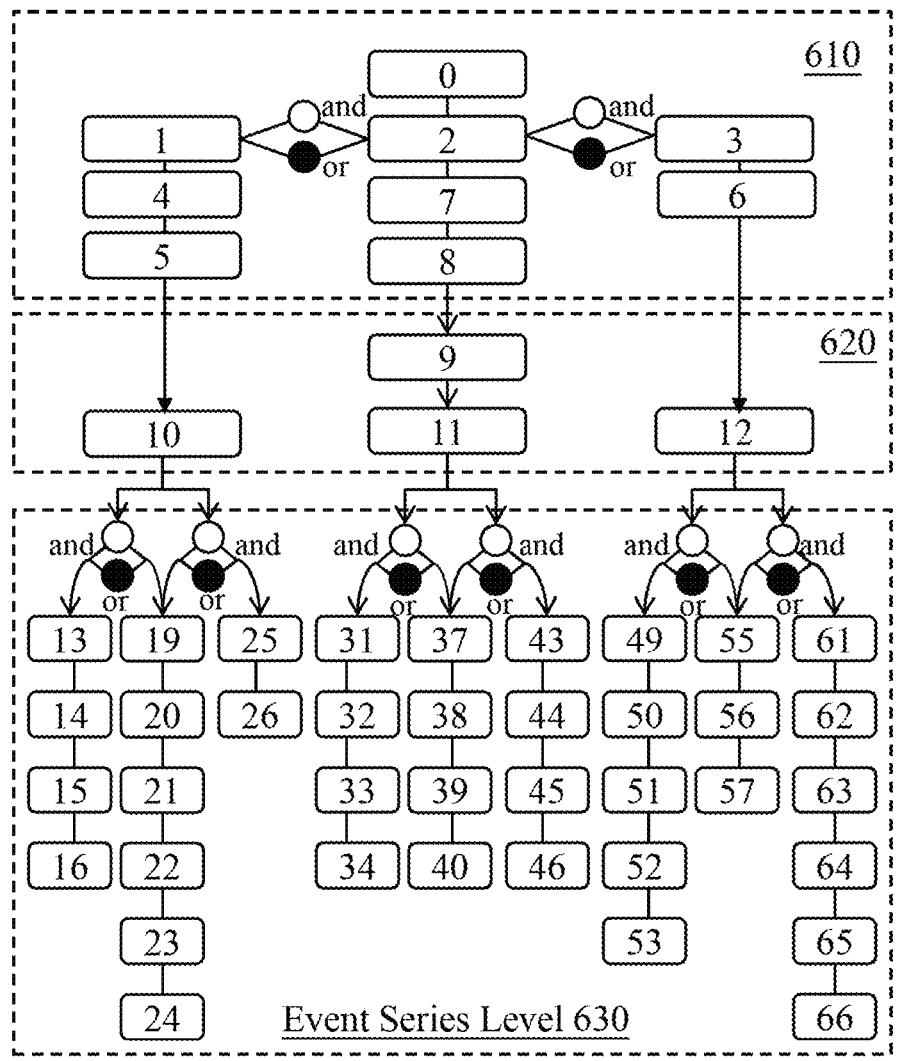
FIG. 11 is an explanatory diagram of a guidance type event level template according to another embodiment.

Please refer to FIG. 11, which is an explanatory diagram of a guidance type event level template according to another embodiment. In the present embodiment, the interactive 3D multimedia editing system may be applied to edit the guiding information in an information guiding system. Event level template 600 includes only three event series levels 610/620/630. Since the information guiding system provides information in a single direction manner, the alignment feature of the event developing points is less branches and more sequent alignments.

Please refer to FIG. 12, which is an explanatory diagram of a script type event level template according to another embodiment. For applications in game scripts, movie scripts, drama scripts, novel writing etc., the interactive 3D multimedia editing system and method provide the writers with a more intuitive and systematic platform incorporated with editing, preview and pilot run of interactive 3D multimedia. The system and method assists the writers to develop story lines more systematically, and also facilitates team discussions and following amendments. In FIG. 12, event level template 700 includes five event series levels 710/720/730/740/750; depends on story types, story lines and scenario complexity, the event developing points/interactive events may be aligned corresponding to the main stream of a story. In the meantime, those event developing points aligned in sequence may have more branches, or even complex cross connections, as the five event series levels 740.

After completing all the editing processes of the interactive 3D multimedia, the system and method for editing interactive 3D multimedia according to the disclosure may execute the interactive 3D multimedia through event executing module 260 in FIG. 1E. In another embodiment, user interface 100 operates the actions of a first character according to received user commands and also activates interactive events when the first character meets with another characters or scene objects. For example, when the interactive 3D multimedia is executed by the event executing module 260 and operated through user interface 100, the interactive 3D multimedia is close to a Role Playing Game (RPG).

In another embodiment, a computer-readable storage medium stores multiple computer-executable commands thereon. A method for editing interactive 3D multimedia is executed when these computer-executable commands are executed. The method for editing interactive 3D multimedia includes the following sections. The interactive 3D multimedia has interactive events. Provide a user interface with an event level template displayed thereon, the event level template has an event series level; and the event series level includes event developing points corresponding to the interactive events. Edit a selected one of the event developing points through the user interface; the selected one of the event developing points being adapted to edit a corresponding one the interactive events regarding a first character. Through a 3D graphic engine, establish relevances between the interactive events and selected materials stored in databases. Output the interactive 3D multimedia with the selected materials. According to a user command, execute the interactive events corresponding to the event developing points. Such computer-readable storage medium is realized by compact discs, memory cards, portable flash memory and databases downloadable through private/public network.

The related descriptions and FIGS. 1E-12, are mainly provided as disclosures of the system and method for editing interactive 3D multimedia. Aside from FIGS. 1A-1D that uses the user terminals as editing hosts and uses the exchange server as a sharing and exchanging mechanism, the architecture and method for online editing and exchanging interactive 3D multimedia according to the disclosure, is able to combine the editing and exchanging function of the interactive 3D multimedia in the exchange server; please refer to FIGS. 13-15 and related descriptions.

FIG. 13 is a systematic diagram of an architecture for online editing and exchanging interactive 3D multimedia according to another embodiment. Online editing and exchanging architecture 1 mainly includes first/second user terminal 1A/1B, and an exchange server 800 in signal connection with first/second user terminal 1A/1B through the internet.

Please refer to FIG. 14, which is a systematic diagram of an exchange server according to another embodiment. Exchange server 800 is a computer system, including a central processing unit as a computing basis, system memory, necessary buses (not shown), an internet-operable lobby interface 810, multiple modules (including scenario section editing module 210, map editing module 220, scene object editing module 230, character editing module 240, event editing module 250 and event executing module 260), for editing interactive 3D multimedia user interface 100, 3D graphic engine 300 and multiple databases (including scenario section database 410, map database 420, scene object database 430, character database 440, event database 450, special effect database 460 and template database 470). The components and elements included in exchange server 800 in FIG. 13-15, have similar definitions and functions as the corresponding ones in FIG. 1A-1D and FIG. 1E-12, so no repeated description is provided here. The main difference is to empower the exchange server 800 with the ability to editing interactive 3D multimedia, such that the remote users may online operate lobby interface 810 and user interface 100 through the internet, and exchange server 800 may receive remote user commands through lobby interface 810 and user interface 100. Therefore, the user edits online an interactive 3D multimedia on exchange server 800, and different users edit online the interactive 3D multimedia shared on exchange server 800. Both first user terminal 1A and second user terminal 1B have a web browser 14 respectively for internet operations.

FIG. 15 is a flowchart of a method for online editing and exchanging interactive 3D multimedia according to another embodiment. Although the embodiment introduces examples based on the flowchart, the method of editing interactive 3D multimedia is not limited to the steps and sequences of the flowchart.

(1) First User Terminal

Step 90: Operate a lobby interface of an exchange server through a web browser. A first user uses web browser 14 of first user terminal 1A to operate the lobby interface 810 of exchange server 800.

(2) Exchange Server

Certainly, the internet-operable lobby interface 810 is provided by the exchange server 800 in advance. Lobby interface 810 includes multiple webpages accessible and operable for the web browsers 14 of first user terminal 1A and second user terminal 1B Step 91: Edit an interactive event corresponding to an event developing point of an event level template in an interactive 3D multimedia according to a first user command from the first user terminal. The first user terminal 1A sends a first user command to operate user interface 100 through lobby interface 810, such that the interactive 3D multimedia may be edited on exchange server 800. The interactive event corresponding to an event developing point of an event level template in the interactive 3D multimedia, is edited by operating user interface 100 through lobby interface 810.

Step 92: Extract a pre-edited interactive 3D multimedia template corresponding to the interactive 3D multimedia and store to the template database. Based on the sharing range of interactive 3D multimedia on exchange server 800, the pre-edited interactive 3D multimedia template may include (1) one or more pre-edited material settings and event level templates of the interactive 3D multimedia; or (2) only the pre-edited event level templates. Here pre-edited material settings include certain setting related to map/character/scenario section/scene object materials. When the interactive 3D multimedia template is extracted and shared with both the pre-edited material settings and event level templates, another user may edit exactly the same interactive 3D multimedia. If only the pre-edited event level templates are shared, another user can only access the pre-edited event level templates without material-oriented information. The concept and practice of the interactive 3D multimedia template, the pre-edited material settings and event level templates are applicable to the embodiments in FIGS. 1A-1D.

Step 93: Operate the lobby interface through the internet and select the pre-edited interactive 3D multimedia template stored in the template database according to a second user command. The second user sends the second user command through web browser 14 of second user terminal 1B to lobby interface 810, and select the pre-edited interactive 3D multimedia template stored in the template database 840 of exchange server 800.

Step 94: Parse the pre-edited interactive 3D multimedia template and through the user interface of the exchange server to edit the interactive event corresponding to the event developing point of the pre-edited event level template included in the interactive 3D multimedia template according to a second user command. Based on different interactive 3D multimedia templates, there may be pre-edited event level templates parsed, or both the pre-edited material settings and event level templates of the pre-edited interactive 3D multimedia template. For the parse method, please refer to FIG. 1D, Step 81 and the related descriptions. The key point is to base on the second user command, edit the interactive event corresponding to the event developing point of the pre-edited event level template included in the interactive 3D multimedia template. Editing of the interactive event needs to operate through lobby interface 810 and user interface 100 of exchange server 800. For example, when clicking the "Activate Editing System" button of the webpages of lobby interface 810 in FIG. 1B, the second user is able to call and redirect to user interface 100 trough lobby interface 810 for further editing operations.

Step 95: Output an internet-playable interactive 3D multimedia through the lobby interface and executed the activated interactive event. The interactive 3D multimedia edited according to the second user command is executed by exchange server 800, and the interactive events included in the interactive 3D multimedia are executed whenever activated. When exchange server 800 executes the interactive 3D multimedia, the map/character/scenario section/scene object materials are output as video and audio forms and transmitted to second user terminal 1B through the internet.

In another embodiment, an architecture for editing and exchanging an interactive 3D multimedia mainly includes an exchange server, a second user terminal and a user interface installed in the exchange server or the second user terminal. The user interface edits the uploaded interactive 3D multimedia according to a second user terminal. The exchange server further includes an internet-operable lobby interface, and a template database. The template database stores one or more uploaded interactive 3D multimedia template of the interactive 3D multimedia. The interactive 3D multimedia is pre-edited according to a first user command. The interactive 3D multimedia template includes a pre-edited event level template; the pre-edited event level template has an event series level; the event series level has event developing points. The second user terminal further includes a web browser, an event editing module, a 3D graphic engine, one or more databases and an event executing module. The web browser selects the uploaded interactive 3D multimedia template according to the second user command. The event editing module parses the interactive 3D multimedia template into a new interactive 3D multimedia according to the second user command. Through the user interface mentioned previously, the interactive events corresponding to the event developing points of the new interactive 3D multimedia are edited. The 3D graphic engine establishes relevances between the interactive events and multiple materials stored in the databases. The event executing module outputs the new interactive 3D multimedia with multiple materials and executes the activated interactive events.

In another embodiment, a computer-readable storage medium stores multiple computer-executable commands thereon. A method for editing and exchanging interactive 3D multimedia is executed when these computer-executable commands are executed. The method for editing and exchanging interactive 3D multimedia includes the following sections. Operate a lobby interface on an exchange server through the internet. Select an interactive 3D multimedia template of the interactive 3D multimedia according to a second user command from a second user terminal. The interactive 3D multimedia is pre-edited by a first user command from a first user terminal. The interactive 3D multimedia template includes a pre-edited event level template; the pre-edited event level template has an event series level; the event series level has event developing points. Parse the interactive 3D multimedia template into a new interactive 3D multimedia, such that interactive events corresponding to the event developing points are edited through a user interface of the exchange server according to the second user command. Output the new interactive 3D multimedia and execute an activated one of the interactive events. Such computer-readable storage medium is realized by compact discs, memory cards, portable flash memory and databases downloadable through private/public network.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A system for editing an interactive 3D multimedia, the interactive 3D multimedia having a plurality of interactive events, the system comprising:

a central processing unit (cpu);

a user interface, operable for a user to edit the interactive 3D multimedia;

an event editing module, providing at least an event level template with at least an event series level, the event series level having a plurality of event developing points for editing an interactive event of the plurality of interactive events wherein each of the corresponding event developing points and the interactive events being related to at least a first character;

a 3D (three dimensional) graphic engine and a plurality of databases, through the 3D graphic engine, relevances between the interactive event and a plurality of selected materials stored in the databases being established; and an event executing module, outputting the interactive 3D multimedia with the selected materials, and according to a user command, the interactive event corresponding to each of the event developing points being executed, wherein any two adjacent ones of the event developing points of the event series level are aligned using an alignment rule, wherein the alignment rule is associated with an AND logic gate and an OR logic gate.

2. The system according to claim 1 further comprising a scenario section editing module, the scenario section editing module displaying at least a set of scenario section information on the user interface, and selecting to edit a scenario section of the interactive 3D multimedia according to a user command from the user interface.

3. The system according to claim 1 further comprising a scene object editing module, the scene object editing module displaying at least a set of scene object information on the user interface, and select to edit a plurality of 3D scene object materials of the interactive 3D multimedia according to a user command from the user interface.

4. The system according to claim 1 further comprising a character editing module, the character editing module displaying at least a set of character setting information on the user interface, and select to edit a plurality of 3D character materials of the interactive 3D multimedia according to a user command from the user interface.

5. A method for editing an interactive 3D multimedia, the interactive 3D multimedia having a plurality of interactive events, the method comprising: providing an user interface with at least an event level template displayed thereon, the event level template having at least an event series level, and the event series level comprising a plurality of event developing points corresponding to an interactive event of the plurality of interactive events;

editing a selected one of the event developing points through the user interface, the selected one of the event developing points being adapted to edit a corresponding one of the interactive events regarding a first character;

through a 3D graphic engine, establishing relevances between the interactive events and a plurality of selected materials stored in a plurality of databases;

outputting the interactive 3D multimedia with the selected materials; and according to a user command, executing the interactive events corresponding to the event developing points, wherein any two adjacent ones of the event developing points of the event series level are aligned using an alignment rule, wherein the alignment rule is associated with an AND logic gate and an OR logic gate.

6. The method according to claim 5 further comprising providing a semitransparent mask overlaying the user interface, and providing a scenario section materials selecting window overlaying the semitransparent mask.

7. The method according to claim 5 further comprising providing a plurality of 3D map materials on the user interface, and displaying text descriptions and an enlarged image corresponding to a selected one of the 3D map materials.

8. The method according to claim 5 further comprising providing a plurality of 3D scene object materials and/or a plurality of 3D character materials on the user interface, and displaying at least an image corresponding to the 3D scene object materials and/or the 3D character materials.

9. The method according to claim 5 further comprising displaying at least one 3D scene object material overlaying at least a 3D map material on the user interface.

10. The method according to claim 5, wherein the interactive event corresponding to the event developing point comprises at least an event activity, and at least an event activity setting column being provided on the user interface for editing the event activity.

11. The method according to claim 5, wherein the event level template comprises at least a blank one and/or at least a pre-edited one of the event developing points, the pre-edited one of the event developing points having pre-edited contents corresponding to the interactive event.

12. The method according to claim 5, wherein any two adjacent ones of the event developing points are aligned in a selective alignment or a sequent alignment.

13. The method according to claim 5, wherein the event developing points of the event series level in the event level template are aligned according to a specific developing logic.

* * * * *